(12) United States Patent
Studer et al.

(10) Patent No.: US 10,911,168 B2
(45) Date of Patent: Feb. 2, 2021

(54) CHANNEL CHARTING IN WIRELESS SYSTEMS

(71) Applicant: Cornell University, Ithaca, NY (US)

(72) Inventors: Christoph Studer, Zürich (CH); Olav Tirkkonen, Helsinki (FI)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 16/965,448

(22) PCT Filed: Feb. 1, 2019

(86) PCT No.: PCT/US2019/016364
§ 371 (c)(1),
(2) Date: Jul. 28, 2020

(87) PCT Pub. No.: WO2019/152849
PCT Pub. Date: Aug. 8, 2019

(65) Prior Publication Data
US 2020/0382228 A1 Dec. 3, 2020

Related U.S. Application Data

(60) Provisional application No. 62/625,431, filed on Feb. 2, 2018.

(51) Int. Cl.
*H04B 17/391* (2015.01)
*H04B 17/373* (2015.01)
(Continued)

(52) U.S. Cl.
CPC ....... *H04B 17/3912* (2015.01); *H04B 7/0452* (2013.01); *H04B 7/0842* (2013.01); *H04B 17/364* (2015.01); *H04B 17/373* (2015.01)

(58) Field of Classification Search
CPC .............. H04B 17/3912; H04B 7/0452; H04B 17/373; H04B 17/364; H04B 7/0842
See application file for complete search history.

(56) References Cited

U.S. PATENT DOCUMENTS

| 8,880,105 | B2 | 11/2014 | Aweya |
| 9,407,299 | B2 | 8/2016 | Futatsugi |

(Continued)

FOREIGN PATENT DOCUMENTS

| CN | 107171702 A | 9/2017 |
| CN | 108390706 A | 8/2018 |

(Continued)

OTHER PUBLICATIONS

Y. Kishiyama et al., "Future Steps of LTE-A: Evolution toward Integration of Local Area and Wide Area Systems," IEEE Wireless Communications, vol. 20, No. 1, Feb. 2013, pp. 12-18.

(Continued)

*Primary Examiner* — Kenneth T Lam
(74) *Attorney, Agent, or Firm* — Ryan, Mason & Lewis, LLP

(57) ABSTRACT

A processing platform in illustrative embodiments comprises one or more processing devices each including at least one processor coupled to a memory. The processing platform is configured to extract channel features of a wireless channel of a wireless system from channel state information characterizing a radio geometry of the wireless channel, to generate a forward charting function that maps the extracted channel features to a channel chart characterizing a representational spatial geometry of the wireless channel, and to utilize the channel chart to estimate at least one position-related characteristic of one or more wireless devices in an actual spatial geometry of the wireless channel. Generating the forward charting function illustratively comprises performing an unsupervised learning process to learn the forward charting function from the extracted channel features. The channel chart is illustratively configured to preserve local geometry of multiple spatial locations associated with (Continued)

the extracted features in the actual spatial geometry of the wireless channel.

23 Claims, 8 Drawing Sheets

(51) Int. Cl.
    *H04B 7/08*      (2006.01)
    *H04B 17/364*    (2015.01)
    *H04B 7/0452*    (2017.01)

(56) References Cited

U.S. PATENT DOCUMENTS

| | | | |
|---|---|---|---|
| 9,654,325 | B2 | 5/2017 | Ros |
| 9,749,873 | B1* | 8/2017 | Chang .................... G01D 4/004 |
| 9,959,587 | B2 | 5/2018 | Sharma et al. |
| 10,050,810 | B2 | 8/2018 | Chen et al. |
| 10,284,239 | B2 | 5/2019 | Kuriyama et al. |
| 10,382,230 | B2 | 8/2019 | Wang et al. |
| 10,608,686 | B1 | 3/2020 | Studer et al. |
| 2006/0019679 | A1 | 1/2006 | Rappaport et al. |
| 2006/0119516 | A1 | 6/2006 | Krumm et al. |
| 2008/0036661 | A1 | 2/2008 | Smith et al. |
| 2012/0147983 | A1 | 6/2012 | Barsoum et al. |
| 2012/0190386 | A1 | 7/2012 | Anderson |
| 2012/0239291 | A1 | 9/2012 | Do |
| 2013/0317944 | A1 | 11/2013 | Huang et al. |
| 2014/0349671 | A1 | 11/2014 | Lakhzouri et al. |
| 2015/0005000 | A1 | 1/2015 | Gyorfi et al. |
| 2015/0172951 | A1 | 6/2015 | Chen et al. |
| 2016/0127019 | A1 | 5/2016 | Schelstraete et al. |
| 2016/0127937 | A1 | 5/2016 | Schelstraete et al. |
| 2016/0277899 | A1* | 9/2016 | Persson ................. H04W 24/10 |
| 2016/0308647 | A1 | 10/2016 | Kwak et al. |
| 2017/0164319 | A1 | 2/2017 | Skaaksrud et al. |
| 2017/0149549 | A1* | 5/2017 | Wang .................... H04B 7/0456 |
| 2017/0212210 | A1* | 7/2017 | Chen ......................... G01S 5/06 |
| 2017/0265189 | A1* | 9/2017 | Stephenne ............. G06F 16/22 |
| 2017/0353222 | A1 | 12/2017 | Wei et al. |
| 2018/0139623 | A1* | 5/2018 | Park .................... G06K 9/00657 |
| 2018/0212662 | A1 | 7/2018 | Ren et al. |
| 2018/0234138 | A1 | 8/2018 | Wu et al. |
| 2018/0242112 | A1* | 8/2018 | Tung ...................... H04W 4/027 |
| 2018/0324595 | A1 | 11/2018 | Shima |

FOREIGN PATENT DOCUMENTS

| | | | |
|---|---|---|---|
| WO | 2014120012 A1 | 8/2014 |
| WO | 2016205980 A1 | 12/2016 |
| WO | 2017098128 A1 | 6/2017 |
| WO | 2018057494 A1 | 3/2019 |
| WO | PCT/US2019/016364 | 5/2019 |

OTHER PUBLICATIONS

F. B. Tesema et al., "Evaluation of Context-Aware Mobility Robustness Optimization and Multi-Connectivity in Intra-Frequency 5G Ultra Dense Networks," IEEE Wireless Communications Letters, vol. 5, No. 6, Dec. 2016, pp. 608-611.
W. C. Y. Lee, "Effects of Correlation Between Two Mobile Radio Base-Station Antennas," IEEE Transactions on Vehicular Technology, vol. 22, No. 4, Nov. 1973, pp. 130-140.
R. Mises et al., "Praktische Verfahren der Gleichungsauflosung," Zeitschrift f'ur Angewandte Mathematik und Mechanik, vol. 9, No. 1, 1929, pp. 58-70.
T. Chen et al., "SoftMobile: Control Evolution for Future Heterogeneous Mobile Networks," IEEE Wireless Communications, vol. 21, No. 6, Dec. 2014, pp. 70-78.
L. Zhou et al., "Cell-edge Inversion by Interference Cancellation for Downlink Cellular Systems," IEEE International Conference on Communication Systems, Nov. 2014, pp. 127-131.
S. Pradhan, "Semantic Location," Personal and Ubiquitous Computing, vol. 4, No. 4, Aug. 2000, pp. 213-216.
A. A. Goshtasby, "Similarity and Dissimilarity Measures," Image Registration: Principles, Tools and Methods, Springer 2012, pp. 7-66.
A. Osseiran et al., "5G Mobile and Wireless Communications Technology," Cambridge University Press, 2016, 439 pages.
A. Alkhateeb et al., "Channel Estimation and Hybrid Preceding for Millimeter Wave Cellular Systems," arXiv:1401.7426v1, Jan. 29, 2014, 36 pages.
A. Alkhateeb et al., "Hybrid Precoding for Millimeter Wave Cellular Systems with Partial Channel Knowledge," Information Theory and Applications Workshop, IEEE, Feb. 2013, 5 pages.
A. Alkhateeb et al., "Limited Feedback Hybrid Precoding for Multi-User Millimeter Wave Systems," IEEE Transactions of Wiireless Communications, vol. 14, Issue 11, Nov. 2015, 14 pages.
B. N. Bhaskar etal., "Atomic Norm Denoising with Applications to Line Spectral Estimation," arXiv:1204.0562v2, Feb. 16, 2013, 27 pages.
J. Deng et al., "MmWave Channel Estimation via Atomic Norm Minimization for Multi-User Hybrid Precoding," arXiv:1801.08601v3, Feb. 14, 2018, 6 pages.
D. L. Donoho et al., "Adapting to Unknown Smoothness via Wavelet Shrinkage," Journal of the American Statistical Association, vol. 90, Issue 432, Jul. 20, 1994, 28 pages.
Z. Gao et al, "Channel Estimation for Millimeter-Wave Massive MIMO with Hybrid Precoding over Frequency-Selective Fading Channels," arXiv:1604.03049v2, Apr. 13, 2016, 4 pages.
S. Jacobsson et al., "Throughput Analysis of Massive MIMO Uplink with Low-Resolution ADCs," arXiv:1602.01139v3, Apr. 3, 2017, 13 pages.
J. Lee et al., "Channel Estimation via Orthogonal Matching Pursuit for Hybrid MIMO Systems in Millimeter Wave Communications," IEEE Transactions on Communications, vol. 64, Issue 6, Jan. 2016, 17 pages.
Y. Li et al., "Channel Estimation and Performance Analysis of One-Bit Massive MIMO Systems," IEEE Transactions on Signal Processing, vol. 65, Issue 15, Aug. 2017, 14 pages.
P. Mächler, "VLSI Architectures for Compressive Sensing and Sparse Signal Recovery," Ph.D. dissertation, ETH Zurich, Switzerland, 2012, 172 pages.
A. Maleki et al., "Asymptotic Analysis of Complex LASSO via Complex Approximate Message Passing (CAMP)," IEEE Transactions on Information Theory, vol. 59, Issue 7, Jul. 2013, 20 pages.
B. Mamandipoor et al., "Newtonized Orthogonal Matching Pursuit: Frequency Estimation over the Continuum," arXiv:1509.01942v2, Apr. 28, 2016, 16 pages.
J. Mo et al., "Channel Estimation in Broadband Millimeter Wave MIMO Systems with Few-Bit ADCs," arXiv:1610.02735v, Dec. 6, 2017, 14 pages.
J. Mo et al., "Channel Estimation in Millimeter Wave MIMO Systems with One-Bit Quantization," Conference on Signals, Systems and Computers, IEEE, Nov. 2014, 5 pages.
A. Mousavi et al., "Parameterless Optimal Approximate Message Passing," arXiv:1311.0035v1, Oct. 31, 2013, 36 pages.
T. S. Rappaport et al., "Wideband Millimeter-Wave Propagation Measurements and Channel Models for Future Wireless Communication System Design," IEEE Transactions on Communications, vol. 63, Issue 9, Sep. 2015, 28 pages.
P. Schniter et al., "Channel Estimation and Precoder Design for Millimeter-Wave Communications: The Sparse Way," Asilomar Conference on Signals, Systems and Computers, IEEE, Nov. 2014, 5 pages.
C. Studer et al., "ASIC Implementation of Soft-Input Soft-Output MIMO Detection Using MMSE Parallel Interference Cancellation," IEEE Journal of Solid-Slate Circuits, vol. 46, Issue 7, Jul. 2011, 12 pages.
R. Tibshirani, "Regression Shrinkage and Selection via the LASSO," Journal of the Royal Statistical Society, Series B, vol. 58, Issue 1, 1996, pp. 267-288.
G. Tang et al., "Compressed Sensing Off the Grid," arXiv:1207.6053v3, Jul. 10, 2013, 51 pages.

(56) References Cited

OTHER PUBLICATIONS

J. A. Tropp et al., "Computational Methods for Sparse Solution of Linear Inverse Problems," California Institute of Technology ACM Technical Report, Jan. 2009, 9 pages.
K. Upadhya et al., "A Risk Minimization Framework for Channel Estimation in OFDM Systems," arXiv:1410.6028v1, Oct. 22, 2014, 29 pages.
P. Zhang et al., "Atomic Norm Denoising-Based Joint Channel Estimation and Faulty Antenna Detection for Massive MIMO," arXiv:1709.06832v1, Sep. 20, 2017, 15 pages.
P. Korrai et al., "FPGA Implementation of OFDM-Based mmWave Indoor Sparse Channel Estimation Using OMP," Circuits Systems and Signal Processing, vol. 37, No. 5, Sep. 2017, Abstract only.
C. Studer et al., "Channel Charting: Locating Users withing the Radio Environment using Channel State Information," IEEE Access, Aug. 2018, 17 pages.
J. G. Andrews et al., "What Will 5G Be?" arXiv:1405.2957v1, May 12, 2014, 17 pages.
T. L. Marzetta "Noncooperative Cellular Wireless with Unlimited Numbers of Base Station Antennas," IEEE Transactions on Wireless Communications, vol. 9, No. 11, Nov. 2010, pp. 3590-3600.
F. Rusek et al., "Scaling up MIMO: Opportunities and Challenges with Very Large Arrays," arXiv:1201.3210v1, Jan. 16, 2012, 30 pages.
E. G. Larsson et al., "Massive MIMO for Next Generation Wireless Systems," arXiv:1304.6690v3, Jan. 21, 2014, 20 pages.
T. S. Rappaport et al., "Millimeter Wave Mobile Communications for 5G Cellular: It Will Work!" IEEE Access, vol. 1, May 2013, 15 pages.
X. Ge et al., "5G Ultra-Dense Cellular Networks," arXiv:1512.03143v1, Dec. 10, 2015, 14 pages.
A. Prasad et al., "Energy Efficient Inter-Frequency Small Cell Discovery Techniques for LTE-Advanced Heterogeneous Network Deployments," IEEE Communications, vol. 51, No. 5, May 2013, 12 pages.
H. Zhao et al., "28 GHz Millimeter Wave Cellular Communication Measurements for Reflection and Penetration Loss in and around Buildings in New York City," in IEEE International Conference on Communications (ICC), Jun. 9-13, 2013, 5 pages.
M. R. Akdeniz et al., "Millimeter Wave Channel Modeling and Cellular Capacity Evaluation," arXiv:1312.4921v3, Apr. 25, 2014, 15 pages.
F. Ahmed et al. "Self-organizing Networks for 5G: Directional Cell Search in mmW Networks," in IEEE International Symposium. Personal, Indoor, and Mobile Radio Communications (PIMRC), Sep. 4-7, 2016, 5 pages.
K. Chandra et al., "CogCell: Cognitive Interplay between 60 GHz Picocells and 2.4/5 GHz Hotspots in the 5G Era," arXiv:1505.01733v1, May 7, 2015, 14 pages.
J. Deng et al., "Resource Allocation and Interference Management for Opportunistic Relaying in Integrated mmWave/sub-6 GHz 5G Networks," IEEE Communications, vol. 55, No. 6, Jun. 2017, 13 pages.
F. Gustafsson et al., "Mobile Positioning using Wireless Networks," IEEE Signal Processing, vol. 41, Jul. 2015, 13 pages.
S. Kumar et al., "Accurate Indoor Localization With Zero Start-up Cost," Proceedings of the 20th Annual International Conference on Mobile Computing and Networking, Sep. 2014, 12 pages.
N. Garcia et al., "Direct Localization for Massive MIMO," arXiv:1607.00946v1, Jul. 4, 2016, 11 pages.
M. Ibrahim et al., "CellSense: An Accurate Energy-Efficient GSM Positioning System," IEEE Transactions on Vehicular Technology, vol. 61, No. 1, Feb. 2012, 11 pages.
X. Wang et al., "DeepFi: Deep Learning for Indoor Fingerprinting Using Channel State Information," 2015 IEEE Wireless Communications and Networking Conference, Mar. 2015, 6 pages.
L. Gao, "Channel State Information Fingerprinting Based Indoor Localization: a Deep Learning Approach," Auburn University M.S. Thesis, Aug. 2015, 81 pages.
X. Wang et al., "CSI Phase Fingerprinting for Indoor Localization with a Deep Learning Approach," IEEE Internet of Things Journal, vol. 3, No. 6, Dec. 2016, 11 pages.
V. Savic et al., "Fingerprinting-Based Positioning in Distributed Massive MIMO Systems," arXiv:1509.00202v1, Sep. 1, 2015, 5 pages.
J. Vieira et al., "Deep Convolutional Neural Networks for Massive MIMO Fingerprint-Based Positioning," arXiv:1708.06235v1, Aug. 21, 2017, 6 pages.
J. G. Andrews, "Seven Ways that HetNets Are a Cellular Paradigm Shift," IEEE Communications, vol. 51, No. 3, Mar. 2013, pp. 136-144.
J. B. Kruskal, "Multidimensional Scaling by Optimizing Goodness of Fit to a Nonmetric Hypothesis," Psychometrika, vol. 29, No. 1, Mar. 1964, 27 pages.
L. Van Der Maaten et al., "Dimensionality Reduction: A Comparative Review," Tilburg University, Center for Creative Computing, Oct. 26, 2009, 36 pages.
D-S. Shiu et al., "Fading Correlation and Its Effect on the Capacity of Multielement Antenna Systems," IEEE Transactions on Communications, vol. 48, No. 3, Mar. 2000, pp. 502-513.
A. Lozano et al., "Fundamental Limits of Cooperation," arXiv:1204.0011v1, Mar. 30, 2012, 27 pages.
K. Gomadam et al., "A Distributed Numerical Approach to Interference Alignment and Applications to Wireless Interference Networks," IEEE Transactions on Information Theory, vol. 55, No. 8, Jun. 2011, 12 pages.
A. Goldsmith, "Wireless Communications," Cambridge University Press, 2005, 427 pages.
3GPP, "LTE; Evolved Universal Terrestrial Radio Access (E-UTRA); Physical Layer Procedures," TS 136.213 V10.1.0 Release 10, Apr. 2011, 117 pages.
J. Venna et al, "Neighborhood Preservation in Nonlinear Projection Methods: Am Experimental Study," Lecture Notes in Computer Science, Sep. 2001, 7 pages.
S. Kaski et al., "Trustworthiness and Metrics in Visualizing Similarity of Gene Expression," BMC Bioinformatics, vol. 4, No. 48, Oct. 13, 2003, 13 pages.
Á. Vathy-Fogarassy et al., "Graph-Based Clustering and Data Visualization Algorithms," Springer, 2013, 120 pages.
D. Tse et al., "Fundamentals of Wireless Communication," Cambridge University Press, 2005, 644 pages.
J. Brady et al., "Beamspace MIMO for Millimeter-Wave Communications: System Architecture, Modeling, Analysis, and Measurements," IEEE Transactions on Antennas Propagation, vol. 61, No. 7, Jul. 2013, 13 pages.
S. Jaeckel et al. "QuaDRiGa: A 3-D Multi-Cell Channel Model With Time Evolution for Enabling Virtual Field Trials," IEEE Transactions on Antennas Propagation, vol. 62, No. 6, Mar. 2014, 15 pages.
K. Pearson, "On Lines and Planes of Closest Fit to Systems of Points in Space," The London, Edinburgh, and Dublin Philosophical Magazine and Journal of Science, vol. 2, No. 11, 1901, 14 pages.
G. H. Golub et al., "Matrix Computations," 3rd Edition, The Johns Hopkins Univeristy Press, 1996, 723 pages.
J. Nocedal et al., "Numerical Optimization," 2nd Edition, Springer, 2006, 683 pages.
A. Beck et al., "A Fast Iterative Shrinkage-Thresholding Algorithm for Linear Inverse Problems," SIAM Journal of Imaging Sciences, vol. 2, No. 1, Jan. 2009, 20 pages.
T. Goldstein et al., "A Field Guide to Forward-Backward Splitting with a FASTA Implementation," arXiv:1411.3406v6, Dec. 28, 2016, 24 pages.
N. Parikh et al., "Proximal Algorithms," Foundations and Trends in Optimization, vol. 1, No. 3, Jan. 2013, 113 pages.
T. S. Rappaport, "Wireless Communications: Principles and Practice," Prentice Hall, 1996, 652 pages.
I. Goodfellow et al., "Deep Learning," MIT Press, 2016, 802 pages.
W. Wang et al., "Generalized Autoencoder: A Neural Network Framework for Dimensionality Reduction," 2014 IEEE Conference on Computer Vision and Pattern Recognition, Jun. 2014, 8 pages.
M. Abadi et al., "TensorFlow: Large-Scale Machine Learning on Heterogeneous Distributed Systems," arXiv:1603.04467v2, Mar. 16, 2016, 19 pages.

(56) References Cited

OTHER PUBLICATIONS

D. Hunter et al., "Selection of Proper Neural Network Sizes and Architectures—A Comparative Study," IEEE Transactions on Industrial Informatics, vol. 8, No. 2, 13 pages.

Cisco, "Cisco Visual Networking Index: Global Mobile Data Traffic Forecast Update, 2016-2021," Feb. 7, 2017, 35 pages.

Dell'Oro Group, "Mobile Infrastructure—Signs of Revival in 1Q17," delloro.com/news/mobile-infrastructure-signs-revival-1q17, May 12, 2017, 2 pages.

P. Popovski, "Ultra-Reliable Communication in 5G Wireless Systems," arXiv:1410.4330v1, Oct. 16, 2014, 7 pages.

J. Thompson et al., "5G Wireless Communication Systems: Prospects and Challenges," Guest Editorial, IEEE Communications Magazine, vol. 52, No. 2, Feb. 2014, 3 pages.

A. L. Swindlehurst et al., "Millimeter-Wave Massive MIMO: The Next Wireless Revolution?" IEEE Communications Magazine, vol. 52, No. 9, Sep. 2014, 7 pages.

J. Hoydis et al., "Massive MIMO: How Many Antennas Do We Need?" arXiv:1107.1709v2, Sep. 23, 2011, 6 pages.

E. Bjornson et al., "Massive MIMO: Ten Myths and One Critical Question," IEEE Communications Magazine, vol. 54, No. 2, Feb. 2016, 10 pages.

M. Sawahashi et al., "Coordinated Multipoint Transmission/Reception Techniques for LTE Advanced," IEEE Wireless Communications, vol. 17, No. 3, Jun. 2010, 10 pages.

G. Zheng et al., "Rethinking the Role of Interference in Wireless Networks," arXiv:1408.6966v1, Aug. 29, 2014, 15 pages.

F. Boccardi et al., "Five Disruptive Technology Directions for 5G," IEEE Communications Magazine, vol. 52, No. 2, Feb. 2014, 8 pages.

J. Wu et al., "Cloud Radio Access Network (C-RAN): A Primer," IEEE Network, vol. 29, No. 1, Jan./Feb. 2015, pp. 35-41.

A. Gudipati et al., "SoftRAN: Software Defined Radio Access Network," in 2nd ACM SIGCOMM Workshop Hot Topics in Software Defined Networking, Aug. 2013, pp. 25-30.

J. Pääkkönen et al., "Device-to-Device Data Storage for Mobile Cellular Systems," IEEE Globecom Workshops, Dec. 2013, 8 pages.

M. Chiang et al., "Fog and IoT: An Overview of Research Opportunities," IEEE Internet of Things Journal, vol. 3, No. 6, Dec. 2016, 12 pages.

L. Lei et al., "Optimal Cell Clustering and Activation for Energy Saving in Load-Coupled Wireless Networks," IEEE Transactions on Wireless Communications, vol. 14, No. 11, Nov. 2015, 15 pages.

A. Prasad et al., "Energy Efficient Small-Cell Discovery Using Received Signal Strength Based Radio Maps," in Proceedings IEEE VTC Spring, Jun. 2013, 6 pages.

M. Rinne et al., "LTE, The Radio Technology Path Towards 4G," Computer Communications, vol. 33, No. 16, Oct. 2010, pp. 1894-1906.

J. B. Tenenbaum et al., "A Global Geometric Framework for Nonlinear Dimensionality Reduction," Science, vol. 290, No. 5500, Dec. 2000, pp. 2319-2323.

V. De Silva et al., "Unsupervised Learning of Curved Manifolds," Lecture Notes in Statistics, vol. 171, 2003, 10 pages.

L. K. Saul et al., "Think Globally, Fit Locally: Unsupervised Learning of Low Dimensional Manifolds," Journal of Machine Learning Research, vol. 4, Jun. 2003, pp. 119-155.

M. Belkin et al., "Laplacian Eigenmaps for Dimensionality Reduction and Data Representation," Neural Computation, vol. 15, No. 6, 2003, pp. 1373-1396.

T. Lin et al., "Riemannian Manifold Learning," IEEE Transactions on Pattern Analysis and Machine Intelligence, vol. 30, No. 5, May 2008, 35 pages.

L. Van Der Maaten, "Visualizing Data using t-SNE," Journal of Machine Learning Research, vol. 9, Nov. 2008, pages 2579-2605.

C. Y. Chang et al., "Impact of Packetization and Functional Split on C-RAN Fronthaul Performance," IEEE International Conference on Communications, May 2016, 7 pages.

V. R. Cadambe et al., "Interference Alignment and Degrees of Freedom of the k-User Interference Channel," IEEE Transactions on Information Theory, vol. 54, No. 8, Aug. 2008, pp. 3425-3441.

A. Hamza et al., "A Survey on Inter-Cell Interference Coordination Techniques in OFDMA-Based Cellular Networks," IEEE Communications Survey & Tutorials, vol. 15, No. 4, 2013, pp. 1642-1670.

A. Prasad et al, "Enhanced Small Cell Discovery in Heterogeneous Networks Using Optimized RF Fingerprints," in Proceedings IEEE PIMRC, Sep. 2013, 6 pages.

A. Prasad et al, "Mobility State Based Flexible Inter-Frequency Small Cell Discovery for Heterogeneous Networks," in Proceedings IEEE PIMRC, Sep. 2013, 6 pages.

W. Weichselberger et al., "A Stochastic MIMO Channel Model With Joint Correlation of Both Link Ends," IEEE Transactions on Wireless Communications, vol. 5, No. 1, Jan. 2006, pp. 90-100.

C. Eckart et al., The Approximation of One Matrix by another of Lower Rank, Psychometrika, vol. 1, No. 3, Sep. 1936, 8 pages.

E. Bingham et al., "Random Projection in Dimensionality Reduction: Applications to Image and Text Data," in Proceedings of ACM SIGKDD International Conference on Knowledge Discovery and Data Mining, 2001, 6 pages.

N. Ailon et al., "Almost Optimal Unrestricted Fast Johnson-Lindenstrauss Transform," arXiv:1005.5513v1, May 30, 2010, 9 pages.

H. Edelsbrunner et al., "Computational Topology: An Introduction," American Mathematical Society, 2010, 294 pages.

A. Dirafzoon et al., Geometric Learning and Topological Inference with Biobotic Networks: Convergence Analysis, arXiv:1607.00051v1, Jun. 30, 2016, 13 pages.

C. Barnhart et al., "Branch-and-price: Column Generation for Solving Huge Integer Programs," Operations Research, vol. 46, No. 3, Jun. 1998, 14 pages.

Y. Chapre et al., "CSI-MIMO: An Efficient Wi-Fi fingerprinting using Channel State Information with MIMO," Pervasive and Mobile Computing, vol. 23, Oct. 2015, pp. 89-103.

E. Dahlman et al., "4G: LTE/LTE-Advanced for Mobile Broadband," Elsevier, Mar. 2011, 447 pages.

J. W. Sammon, "A Nonlinear Mapping for Data Structure Analysis," IEEE Transactions on Computers, vol. C-18, No. 5, May 1969, pp. 401-409.

M. Koivisto et al., "High-Efficiency Device Positioning and Location-Aware Communications in Dense 5G Networks," IEEE Communications Magazine, vol. 55, No. 8, Aug. 2017, pp. 188-195.

G. B. Huang et al., "Extreme Learning Machine for Regression and Multiclass Classification," IEEE Transactions on Systems, Man and Cybernetics—Part B: Cybernetics, vol. 42, No. 2, Apr. 2012, pp. 513-529.

G.P. Fettweis et al., "The Tactile Internet—Applications & Challenges," IEEE Vehicular Technology Magazine, vol. 9, No. 1, Mar. 2014, 6 pages.

J. Kerttula et al., "Implementing TD-LTE as Software Defined Radio in General Purpose Processor," in ACM SIGCOMM, Workshop of Software Radio Implementation Forum, Aug. 2014, 7 pages.

H. Li et al., "Supervised Learning on Local Tangent Space," Lecture Notes on Computer Science, No. 3496, 2005, pp. 546-551.

J. Y. Hua et al., "Accurate Estimation of Doppler Shift in Mobile Communications with High Vehicle Speed," International Journal of Communication Systems, vol. 27, No. 12, Dec. 2014, pp. 3515-3525.

H. Hotelling, "Analysis of a Complex of Statistical Variables into Principal Components," Journal of Educational Psychology, vol. 24, No. 6, 1933, 25 pages.

Z. Gao et al., "MmWave Massive MIMO Based Wireless Backhaul for 5G Ultra-Dense Network," arXiv:1508.03940v3, Nov. 27, 2015, 7 pages.

C. Jiang et al., "Machine Learning Paradigms for Next-Generation Wireless Networks," IEEE Wireless Communications, 2016, 8 pages.

A. Hakkarainen et al., "High-Efficiency Device Localization in 5G Ultra-Dense Networks: Prospects and Enabling Technologies," 2015 IEEE 82nd Vehicular Technology Conference, Sep. 2015, 5 pages.

(56) References Cited

OTHER PUBLICATIONS

A. Klautau et al., "5G MIMO Data for Machine Learning: Application to Beam-Selection using Deep Learning," 2018 Information Theory and Applications Workshop, Feb. 2018, 9 pages.
A. Abboud et al., "Indoor Massive MIMO: Uplink Pilot Mitigation Using Channel State Information Map," IEEE International Conference on Computational Science and Engineering, 2016, 7 pages.
E. Balevi et al., "Unsupervised Machine Learning in 5G Networks for Low Latency Communications," IEEE International Performance Computing and Communications Conference, Dec. 2017, 2 pages.
J. Liu et al., "Seeing the Unobservable: Channel Learning for Wireless Communication Networks," arXiv:1508.01899v2, Aug. 24, 2015, 6 pages.
T. J. O'Shea et al., "Deep Learning-Based MIMO Communications," arXiv:1508.01899v2, Jul. 25, 2017, 9 pages.

\* cited by examiner

CHANNEL CHARTING IN WIRELESS SYSTEMS

PRIORITY CLAIM

The present application claims priority to U.S. Provisional Patent Application Ser. No. 62/625,431 filed Feb. 2, 2018 and entitled "Channel Charting in Wireless Systems," which is incorporated by reference herein in its entirety.

FIELD

The field relates generally to wireless systems, and more particularly to techniques for processing radio channel measurements and other types of channel data generated in wireless systems.

BACKGROUND

Fifth generation (5G) networks must sustain a massive increase in traffic volumes, number of terminals, and reliability/latency requirements. In order to cope with these challenges, researchers have proposed a range of new technologies that improve spectral efficiency through massive multiple-input multiple-output (mMIMO), increase bandwidth by harnessing millimeter-wave (mmWave) bands for mobile communication, and rely on an extreme densification of network elements. While the advantages of these emerging technologies are readily apparent, they entail severe practical challenges. Mobility, in particular, poses problems for dense small-cell networks, as well as for mMIMO and mmWave networks which provide extremely fine-grained angular separation. In mmWave networks, coverage is often patchy and handover regions between cells are sharp. Hence, smooth handovers, multipoint operation, and/or cell search requires multipoint channel state information (CSI). However, potential solutions to some of these issues, such as integrated multiband operation as well as mobile relaying, will require significant amounts of multipoint CSI.

SUMMARY

Illustrative embodiments of the invention provide techniques for charting or otherwise characterizing radio channels in wireless systems, in a manner that addresses many of the above-noted challenges.

A processing platform in illustrative embodiments comprises one or more processing devices each including at least one processor coupled to a memory. The processing platform is configured to extract channel features of a wireless channel of a wireless system from CSI characterizing a radio geometry of the wireless channel, to generate a forward charting function that maps the extracted channel features to a channel chart characterizing a representational spatial geometry of the wireless channel, and to utilize the channel chart to estimate at least one position-related characteristic of one or more wireless devices in an actual spatial geometry of the wireless channel.

Generating the forward charting function illustratively comprises performing an unsupervised learning process to learn the forward charting function from the extracted channel features. The channel chart is illustratively configured to preserve local geometry of multiple spatial locations associated with the extracted features in the actual spatial geometry of the wireless channel.

In some embodiments, a processing platform of the type described above comprises at least a portion of at least one of a base station of the wireless system and a baseband unit of a cloud radio access network of the wireless system. Additional or alternative system components such as a wireless access point of the wireless system, and/or a given one of the one or more wireless devices of the wireless system, can be utilized in implementing at least portions of the processing platform. It is also possible for a processing platform to be implemented at least in part within an information processing system coupled to or otherwise associated with the wireless system. The term "processing platform" as used herein is therefore intended to be broadly construed, and a wide variety of alternative implementations of the processing platform are possible in other embodiments.

These and other embodiments of the invention include but are not limited to wireless systems, information processing systems, methods, apparatus, processing devices, integrated circuits, and computer program products comprising processor-readable storage media having software program code embodied therein.

DETAILED DESCRIPTION

Embodiments of the present invention can be implemented, for example, in the form of wireless systems and/or associated information processing systems, each comprising at least a portion of what is generally referred to herein as a "processing platform." In some embodiments, a wireless system includes or is otherwise associated with an information processing system that performs data analytics on channel data or otherwise processes radio channel measurements or other types of channel data generated in the wireless system. Illustrative embodiments of such wireless systems and/or associated information processing systems will be described in detail herein. It should be understood, however, that embodiments of the invention are more generally applicable to a wide variety of other types of wireless systems and/or information processing systems. Accordingly, terms such as "wireless system" and "information processing system" as used herein are intended to be broadly construed.

Illustrative embodiments to be described in detail below are configured to provide what is referred to herein as "channel charting" or CC for short, a novel framework in which a multi-antenna network element learns a chart of the radio geometry in its surrounding area. The channel chart captures the local spatial geometry of the area so that points that are close in space will also be close in the channel chart and vice versa. CC illustratively works in a fully unsupervised manner, for example, learning is only based on radio channel measurements that are passively collected at a single point in space, but from multiple transmit locations in the area over time. CC then extracts channel features that characterize large-scale fading effects. Finally, the channel charts are generated with tools from dimensionality reduction, manifold learning, metric learning, and artificial neural networks.

A given network element performing CC may comprise, for example, a multi-antenna base station in a cellular system, or a Baseband Unit (BBU) in a cloud radio access network, and the charted area may be the served cell, or a multi-cell area covered by the BBU. Logical relationships related to the position of a transmitter (e.g., a user equipment) in the cell can then be directly deduced from comparing measured radio channel characteristics to the channel chart. The unsupervised nature of CC enables many new applications in network planning, user scheduling, multipoint connectivity, handover, cell search, and other cognitive tasks that rely on CSI and user movement relative to the base station.

Figure 1:
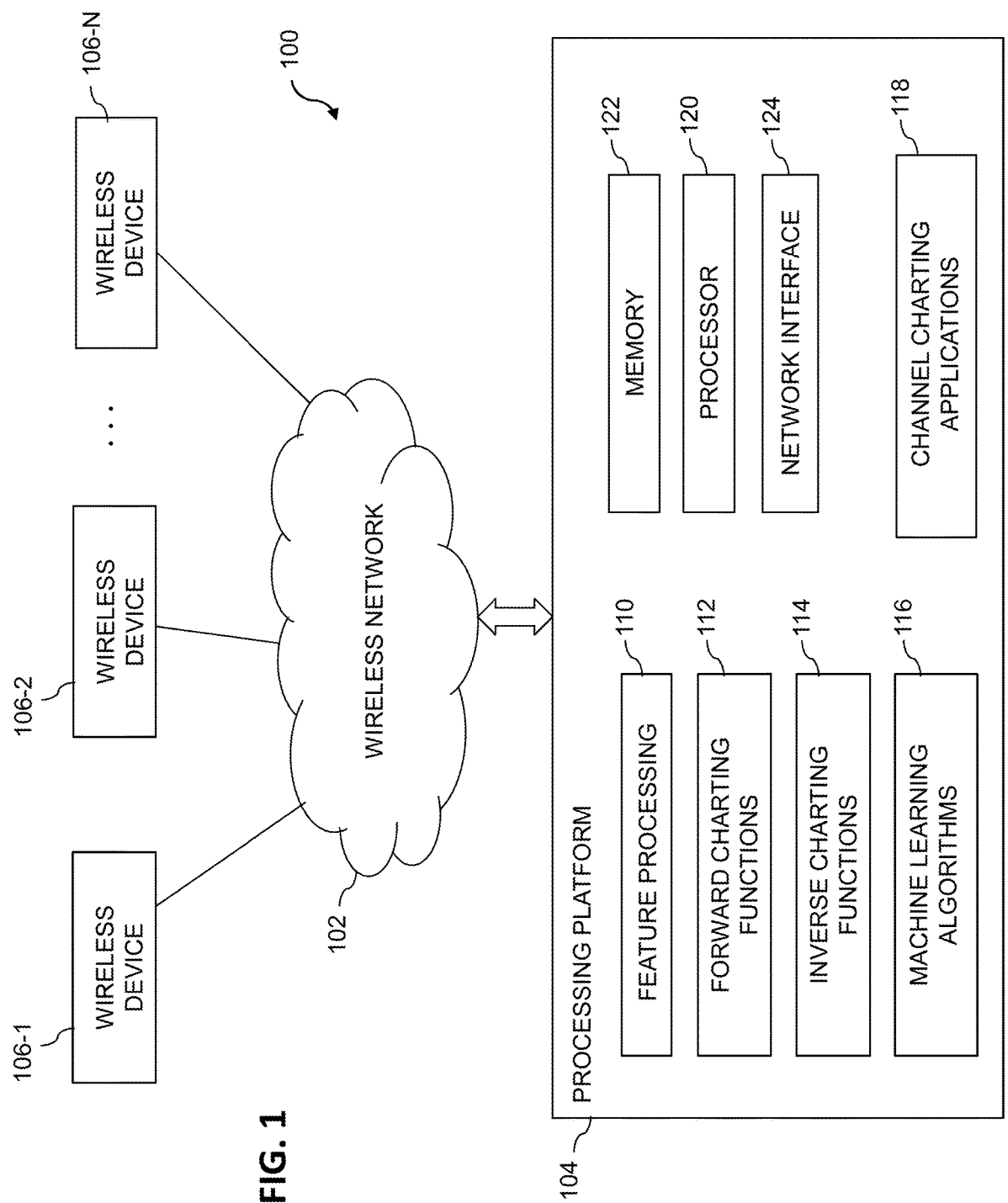
FIG. 1 is a block diagram of a wireless system with channel charting functionality in an illustrative embodiment.

FIG. 1 shows a wireless system 100 with channel charting functionality in an illustrative embodiment. The wireless system 100 comprises a wireless network 102 configured to communicate with multiple wireless devices 106-1, 106-2, . . . 106-N. The wireless devices 106 can comprise mobile telephones, portable computers or other types of user equipment in any combination. The wireless network 102 illustratively comprises multiple base stations of a radio access network (RAN) of the wireless system 100, as well as other system components such as core network components of a type commonly associated with a 5G wireless system or other type of wireless system. For example, the wireless network 102 can additionally or alternatively comprise multiple Remote Radioheads (RRHs) and BBUs in a cloud-based RAN ("Cloud-RAN"). Numerous other arrangements are possible, and may involve various types of baseband processors other than BBUs.

The wireless system 100 further comprises a processing platform 104 that is associated with the wireless network 102 and configured to process CSI or other types of channel data generated in the wireless system 100.

Illustrative embodiments are configured to exploit multi-dimensional characteristics of radio channels in the wireless system 100. These characteristics include, for example, radio channel measurements (e.g., channel snapshots) at multiple antennas (e.g., measurements from all antennas, which provides information on the spatial domain), multiple frequencies (e.g., measurements over a wide frequency band), and/or over multiple delays (e.g., measurement of delays caused by scatterers). In contrast to many existing methods that use scalar information, such as received signal strength indication (RSSI) or angle-of-arrival (AoA), illustrative embodiments exploit the availability of multi-dimensional CSI.

Moreover, channel charting in some embodiments is fully unsupervised, and may be configured to collect only radio channel measurements to build the channel chart, without relying in any way on physical channel models. These embodiments can be further configured so as to not rely in any way on positioning information from global navigation satellite systems (GNSSs), such as the global positioning system (GPS) or others.

The processing platform 104 comprises multiple components that are utilized to implement channel charting functionality in the wireless system 100, including a feature processing module 110, forward charting functions 112, inverse charting functions 114, machine learning algorithms 116, and channel charting applications 118. Additional or alternative channel charting components can be used in other embodiments.

Although shown as separate from the wireless network 102, at least portions of the processing platform 104 in some embodiments may be implemented internally to the wireless network 102. For example, at least portions of the channel charting functionality of the processing platform 104 may be implemented at least in part in one or more of the base stations or BBUs of the RAN of the wireless network 102. One or more of the wireless devices 106 and/or one or more wireless access point can additionally or alternatively be used to implement at least portions of the channel charting functionality of the processing platform 104. A given "processing platform" as the term is broadly used may therefore comprise at least one of a base station, a BBU, a wireless access point and a wireless device.

It is also possible for the processing platform 102 to be implemented at least in part in an information processing system that is separate from the wireless system 100. For example, the processing platform 102 can comprise a Big Data analytics platform that processes CSI or other types of channel data from the wireless network 102. Numerous alternative processing platform arrangements are possible in other embodiments.

The processing platform 102 is an example of what is more generally referred to herein as a "charting entity" implemented within or otherwise associated with the wireless system 100. Such an entity generates a channel chart or other related output of a channel charting process as disclosed herein. A channel chart in some embodiments is in the form of one or more data structures storing vector data.

In some embodiments, the wireless system 100 generates proximity information of a number of wireless devices at a charting entity. This illustratively involves collecting a number of signal snapshots of the wireless devices, where a given signal snapshot describes multi-dimensional characteristics of radio frequency channels between a corresponding wireless device and a single communication entity controlled by the charting entity. A proximity map of the wireless devices is generated based on the collected signal snapshot in which wireless devices that are close in physical space are close in the proximity map. The physical dimensions of the communication entity controlled by the charting entity are typically small as compared to the average distance between the wireless devices.

Such a proximity map is considered an example of what is more generally referred to herein as a "channel chart." The term "channel chart" and related terms such as "channel charting" as used herein are intended to be broadly construed, so as to encompass data mappings and/or associated visualizations as well as other arrangements of information characterizing channel data in a low-dimensional representation. For example, channel charts in some embodiments are each implemented at least in part in the form of one or more data structures that are generated and processed by the processing platform 104. References herein to "channel charts" should therefore not be viewed as requiring any particular visualization, but can more generally comprise data structures that are processed internally by computers or other network elements, or more generally processing devices, in a given wireless system and/or associated information processing system, in conjunction with performing various automated actions or implementing other types of wireless system functionality, such as controlling handovers, beam selection and other aspects of wireless communication.

The communication entity in an arrangement of the type described above illustratively comprises an access point of a base station of the wireless network 102.

The charting entity need not comprise an intended receiver for communication. For example, the charting entity may comprise an independent "box" or other type of processing platform that passively listens to communication to build a channel chart. Such an arrangement may be particularly useful, for example, in defense or law enforcement applications, in that tracking and localization could be performed without the charting entity necessarily being part of the wireless network 102.

It should be noted that relative velocity information may be extracted from the measured signal snapshots, in addition to proximity information. Thus, some embodiments may utilize, for example, proximity and velocity maps. Other types of channel charts may be used in other embodiments.

The proximity and velocity information may be utilized in the wireless system 100 to perform a wide variety of different tasks relevant to management of the wireless network 102 and other aspects of the system 100. These different tasks may be considered part of the applications 118 and illustratively include the following:

1. Localization: The generated proximity map can be used to extract relative location information between the wireless devices and the charting entity, or between the wireless devices. This can, for example, be used to extract information when device-to-device communication could be favorable over communication via the base station. By associating certain points in the proximity map with semantic location information, one can use the technique for localization services. Advantageously, these and other localization tasks can be implemented without relying in any way on positioning information from GNSSs.

2. Event labeling: Labeling the proximity map with events in the network, such as handovers, radio link failures, and presence of a small cell.

3. Rate adaptation: The generated proximity map indicates if multiple wireless devices are at a common location, which can be used to guide the adaptation of communication rates for each such user. If a wireless device moves towards the cell boundary, as extracted from the proximity and velocity information, the rate can preventively be reduced even before the device will be in an area of bad reception. This mitigates transmission failures and improves communication reliability.

4. Network planning: The generated proximity map can be used to identify locations for which the channel conditions are poor or hard to separate from other channels or locations. One can then deploy an additional antenna in such areas of poor reception to improve coverage and separation of users, or to mitigate inter-user interference.

5. Switching on and off base stations: For energy efficiency, small cell base stations may be switched off during low traffic times to save energy. Network management has apriori no way to estimate when it would be beneficial to turn a small cell on again. A labeled proximity map can be used for this.

6. User scheduling: The proximity and velocity information can be used to determine which user the mapping entity should communicate with, in contrast to, e.g., communicating with the user having the best channel. The method can be used to proactively schedule traffic to users before they enter a region of bad reception, or to postpone scheduling, when a user is about to enter a hot spot served by a high-capacity small cell or WiFi access point.

7. Hand over: The proximity and velocity information can be used to determine whether a user is moving into the proximity of another cell or another service (e.g., WiFi or picocells). One can then perform handover to another cell or another service before conventional algorithms would detect that a handover will be necessary. This improves the reliability for cell-edge users or reduces the data rates from/to the base station as other services could be used. Also, fewer or no measurements performed by the users are needed to determine the possibility/need for hand over.

8. Beam selection and cell search: The generated proximity map can be used to determine the beams between wireless devices and a base station, or to determine the training that is required if a new user enters a cell or switches on mobile service. In addition, the method enables one to transmit the beams to be used by the user so that the direction to the future base station can be found faster or more reliably.

9. User tracking: The generated proximity and velocity maps can be used to track and predict movement of wireless devices, which can be used to identify traffic conditions (e.g., of vehicles, trains, or other transportation methods), locations of large, moving crowds, or detecting or predicting other activities related to motion of the users.

10. Cognitive tasks: The generated proximity and velocity maps can be used to anticipate events in the network, which includes intent of user movement, which can be related to their location, movement, velocity, relative position among users, relative position to static objects, etc.

It is apparent from the foregoing examples that proximity maps, velocity maps and other types of channel charts or associated channel charting information as disclosed herein can be used to anticipate a wide variety of different types of events within a wireless system, thereby enabling the wireless system to take appropriate responsive actions to address such anticipated events. This provides improved wireless system performance and other advantageous outcomes relative to conventional practice.

More detailed views of possible implementations of wireless system components such as components 110, 112, 114, 116 and 118 of the processing platform 104 in illustrative embodiments will be described below in conjunction with FIGS. 2A and 2B.

The processing platform 104 if not implemented internally to the wireless network 102 can communicate with other wireless system components via one or more other networks, including, for example, a global computer network such as the Internet, a wide area network (WAN), a local area network (LAN), a satellite network, or various portions or combinations of these and other types of communication networks.

The processing platform 104 in the present embodiment further comprises a processor 120, a memory 122 and a network interface 124. The processor 120 is assumed to be operatively coupled to the memory 122 and to the network interface 124 although such interconnections are not explicitly shown in the figure.

The processor 120 may comprise, for example, a microprocessor, an application-specific integrated circuit (ASIC), a field-programmable gate array (FPGA), a central processing unit (CPU), a graphics processing unit (GPU), an arithmetic logic unit (ALU), a digital signal processor (DSP), or other similar processing device component, as well as other types and arrangements of processing circuitry, in any combination.

The memory 122 stores software program code for execution by the processor 120 in implementing portions of the functionality of the processing platform 104. For example, at least portions of the functionality of one or more of the channel charting related components 110, 112, 114, 116 and 118 of processing platform 104 can be implemented using program code stored in memory 122.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), magnetic memory, optical memory, non-volatile memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with one or more of the components 110, 112, 114, 116 and 118 of the processing platform 104 as well as other channel charting related functionality.

The network interface 124 is configured to allow the processing platform 104 to communicate with other system elements over one or more networks, and may comprise one or more conventional transceivers.

In operation, the processing platform 104 in illustrative embodiments is configured to extract channel features of a wireless channel of the wireless system 100 from CSI characterizing a radio geometry of the wireless channel, to generate a forward charting function that maps the extracted channel features to a channel chart characterizing a representational spatial geometry of the wireless channel, and to utilize the channel chart to estimate at least one position-related characteristic of one or more of the wireless devices 106 of the wireless system 100 in an actual spatial geometry of the wireless channel. The term "wireless channel" as used herein is intended to be broadly construed, and should not be viewed as being limited to any particular example channel types referred to herein.

The extraction of channel features is illustratively performed by a feature extractor implemented in the feature processing module 110. The generated forward charting function comprises one of the forward charting functions 112 of the processing platform 104.

The CSI is illustratively generated by one or more multi-antenna receivers of the wireless system 100 utilizing communications received from the one or more of the wireless devices 106 over the wireless channel.

For example, in some embodiments, the CSI can comprise channel measurements that are collected over time by a given one of the multi-antenna receivers from a plurality of wireless device transmit locations in a designated area of the wireless system 100. The designated area can comprise, for example, a served cell of a base station that includes the given multi-antenna receiver, or a multi-cell area covered by a BBU of a Cloud-RAN, although other types of designated areas can be used.

The generation of the forward charting function illustratively comprises performing an unsupervised learning process to learn the forward charting function from the extracted channel features. For example, the unsupervised learning process in some embodiments is configured to implement a designated dimensionality reduction technique to map a relatively high-dimensional point set of the extracted channel features into a relatively low-dimensional point set of the channel chart.

A number of particular examples of the above-noted dimensionality reduction techniques used to provide unsupervised learning of the forward charting function will be described in detail elsewhere herein, including principal component analysis (PCA) performed on a centered version of the extracted channel features, a Sammon's mapping process configured to map a relatively high-dimensional point set of the extracted channel features into a relatively low-dimensional point set of the channel chart, and an autoencoder process implementing an artificial neural network for unsupervised dimensionality reduction.

It is to be appreciated, however, that PCA, Sammon's mapping and autoencoders, although described in detail herein, are only examples. A wide variety of other types of dimensionality reduction techniques can be utilized in illustrative embodiments to map a high-dimensional point set of extracted channel features into a low-dimensional point set of a channel chart, including, again by way of example only, multidimensional scaling (MDS), Laplacian eigenmaps (LE), diffusion maps, Stochastic Neighborhood Embedding (SNE) or t-student SNE, and Siamese neural networks implementing a pair of equivalent artificial neural networks for unsupervised dimensionality reduction.

The unsupervised learning process in some embodiments is configured to utilize what is referred to herein as "side information" illustratively obtained from a baseband unit of the wireless system 100. For example, such side information may comprise information indicating that a particular subset of the extracted channel features are associated with a particular one of the wireless devices 106. Other types of side information obtained from other components of the wireless system 100 can additionally or alternatively be used.

In some embodiments, at least a portion of the extracted channel features characterize at least one of large-scale fading effects, directional information and time-of-flight (ToF) information of the wireless channel. Other types of channel features can be extracted from the CSI in other embodiments.

As indicated above, the representational spatial geometry characterized by the channel chart in illustrative embodiments has a substantially lower dimensionality than the radio geometry of the wireless channel.

Moreover, a given channel chart generated by the processing platform 104 is advantageously configured to preserve local geometry of multiple spatial locations associated with the extracted features in the actual spatial geometry of the wireless channel. As a result, first and second points that are located close to one another in the actual spatial geometry of the wireless channel are also close to one another in the channel chart and vice versa.

The processing platform 104 is further configured to generate an inverse charting function relating spatial locations in the representational spatial geometry of the wireless channel to channel features of the wireless channel. The generated inverse charting function comprises one of the inverse charting functions 114 of the processing platform 104. Generating the inverse charting function illustratively comprises performing an unsupervised learning process to learn the inverse charting function from the representational spatial geometry. For example, fully unsupervised learning may be performed to generate both the forward charting function and the inverse charting function.

The channel charting applications 118 in some embodiments are configured to estimate at least one position-related characteristic of one or more of the wireless devices 106 in an actual spatial geometry of the wireless channel. This estimation may more particularly involve, for example, estimating positional information of a given one of the wireless devices 106, predicting an in-cell event involving the given wireless device, estimating CSI between the given wireless device and one or more base stations in one or more cells of the wireless system 100 other than a current cell of the given wireless device, and estimating CSI between the given wireless device and at least one other wireless device. Examples of such estimating arrangements are described below in conjunction with FIG. 6.

In some estimation applications, utilizing the channel chart to estimate at least one position-related characteristic of one or more of the wireless devices 106 in an actual spatial geometry of the wireless channel comprises extracting additional channel features from additional CSI characterizing the radio geometry of the wireless channel, comparing the additional channel features to the channel chart, and estimating the position-related characteristic based at least in part on a result of the comparing.

A wide variety of other types of channel charting applications 118 can be configured to utilize channel charts generated in the manner disclosed herein.

Additional illustrative embodiments implementing channel charting functionality will now be described with reference to FIGS. 2A and 2B.

Figure 2A:
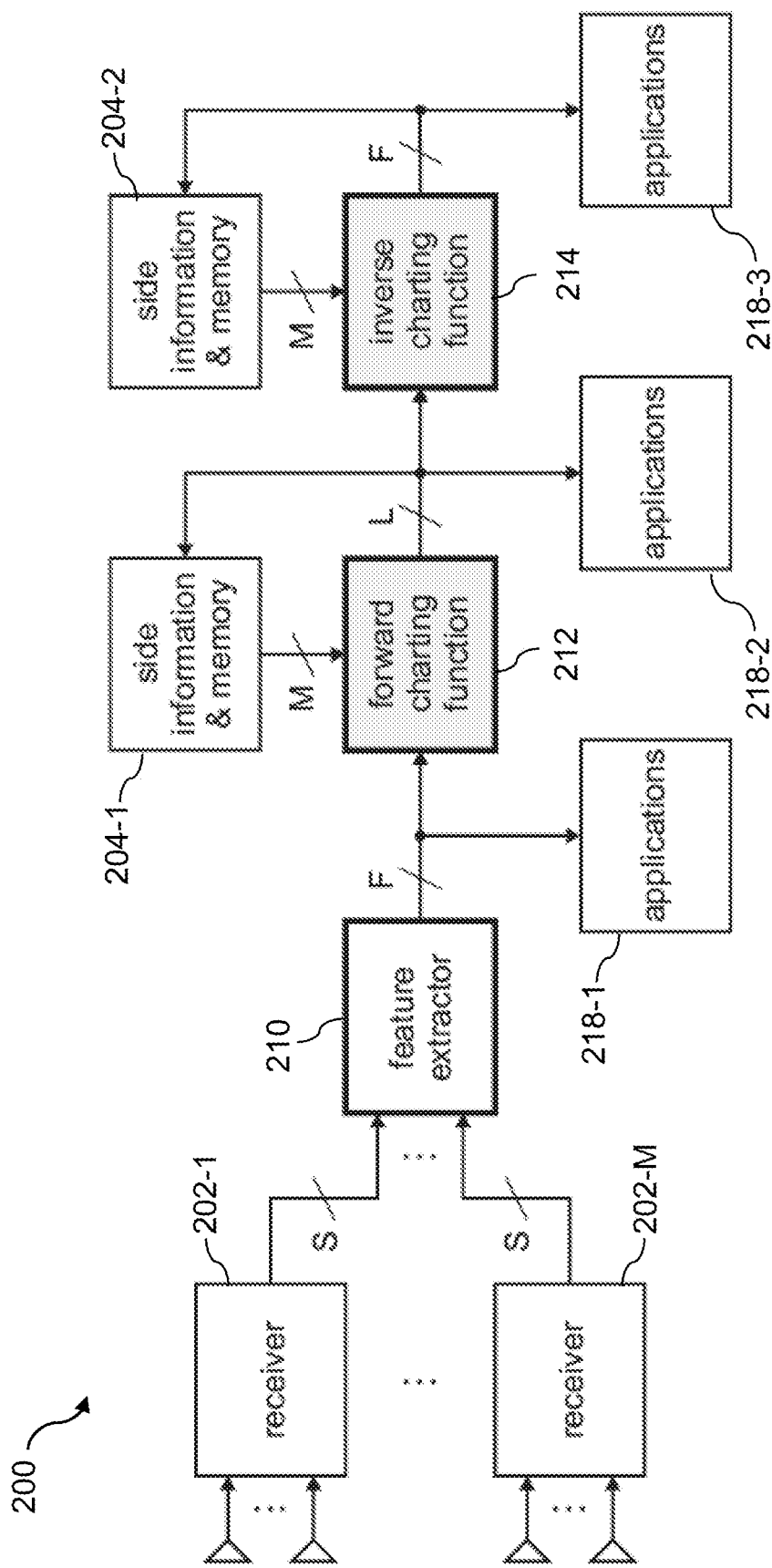
FIGS. 2A and 2B show more detailed views of portions of a wireless system with channel charting functionality in other illustrative embodiments.

FIG. 2A shows a portion 200 of one possible implementation of a wireless system with channel charting functionality. The portion 200 may represent a portion of the wireless system 100. The portion 200 comprises a set of receivers 202-1, ... 202-M coupled to a feature extractor 210, and includes a forward charting function 212 and an inverse charting function 214, as well as associated side information & memory instances 204-1 and 204-2, and a plurality of sets of applications 218-1, 218-2 and 218-3, all arranged as shown. Each of the receivers 202 comprises a set of multiple antennas in this embodiment. The feature extractor 210, forward charting function 212, inverse charting function 214 and applications 218 in the FIG. 2A embodiment may be viewed as examples of specific instances of the respective corresponding components 110, 112, 114 and 118 of the wireless system 100 of FIG. 1.

In this embodiment, the feature extractor 210 takes in receive signals (S) from the receivers 202 to generate high-dimensional channel features (F). The forward charting function 212 takes in F from the feature extractor 210, and utilizes F in combination with side information & memory (M) from component 204-1 to learn low-dimensional representations (L). The inverse charting function 214 takes in L from the forward charting function 212, and utilizes L in combination with M from component 204-2 to learn F. Such learning functions are illustratively implemented using one or more of the machine learning algorithms 116 in the FIG. 1 embodiment. By way of example, techniques such as manifold learning, metric learning and/or artificial neural networks may be applied in a given embodiment. Other types of artificial intelligence (AI) functionality can be incorporated into wireless system 100 to support unsupervised learning in conjunction with generation of channel charts. Also, the various sets of applications 118-1, 118-2 and 118-3 can make use of F and L.

Figure 2B:
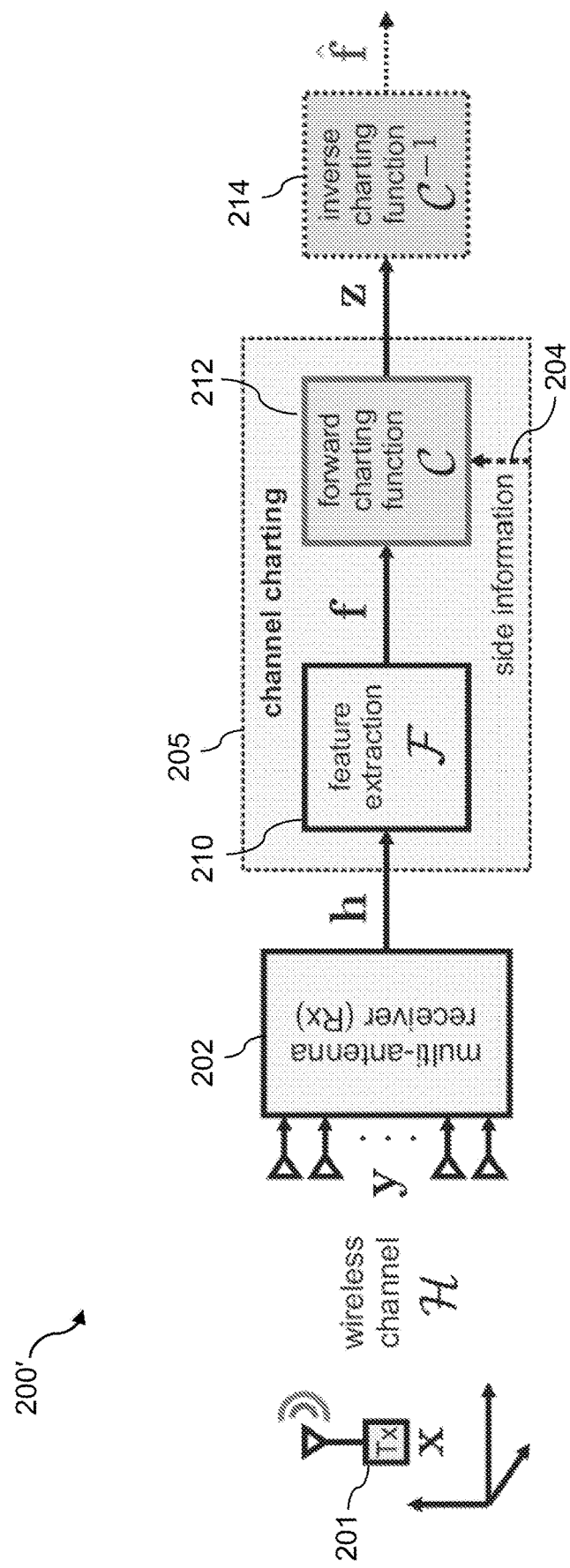

FIG. 2B shows a portion 200' of another possible implementation of a wireless system with channel charting functionality. Again, portion 200' may represent a portion of the wireless system 100. The portion 200' comprises a single multi-antenna receiver 202 that communicates over a wireless channel with a particular wireless device 201. A charting entity 205 comprises feature extractor 210 and forward charting function 212, as well as one or more associated side information & memory instances 204. The portion 200' further comprises inverse charting function 214.

The receivers 202 in the illustrative embodiments of FIGS. 2A and 2B can comprise, for example, receivers associated with one or more base stations or BBUs of wireless network 100, with each such base station having a potentially large number of antennas. Other arrangements are possible. For example, a given one of the receivers can be associated with a single mobile device or may comprise a static receiver having only one antenna.

It is to be appreciated that the particular arrangements of components and other system elements shown in FIGS. 1, 2A and 2B are presented by way of illustrative example only, and numerous alternative embodiments are possible.

For example, other embodiments of wireless systems and/or information processing systems configured to provide channel charting functionality are described in conjunction with FIGS. 3 through 7 below. One or more of these embodiments may be viewed as more detailed examples of possible implementations of wireless system 100 of FIG. 1 and/or of the portions 200 and 200' of the wireless systems illustrated in FIGS. 2A and 2B.

Again, it is to be appreciated that these and other embodiments disclosed herein are presented by way of illustrative example only, and should not be construed as limiting in any way.

Numerous alternative arrangements for implementing channel charting functionality can be utilized in other embodiments.

For example, although illustrative embodiments are described in the context of 5G wireless systems and are particularly well-suited for use in channel charting within such systems, the disclosed techniques are applicable to a wide variety of other types of wireless systems, including other systems that provide multi-dimensional CSI, channel snapshots or other types of channel data.

Other types of wireless systems that can be configured to incorporate channel charting functionality of the type disclosed herein include systems configured in accordance with standards such as, for example, 3GPP long-term evolution (LTE), 5G/NR, WiFi (IEEE 802.11), WiMax (IEEE 802.16e), TD-SCDMA, HSDPA/EDGE/GSM, Bluetooth, Zigbee, LoRa, SigFox, NB-IoT, and CDMA-2000. The wireless system 100 may therefore more particularly comprise a wireless system configured in accordance with one of these standards.

Accordingly, the embodiments described herein are considered illustrative only, and should not be viewed as limited to any particular arrangement of features. For example, those skilled in the art will recognize that alternative processing operations and associated system component configurations can be used in other embodiments. It is therefore possible that other embodiments may include additional or alternative system components, relative to the components of the illustrative embodiments. Also, the particular channel charting processes and associated channel data formats and channel chart formats can be varied in other embodiments.

It should also be noted that the above-described wireless system and/or information processing system arrangements are exemplary only, and alternative system arrangements can be used in other embodiments.

Additional details regarding the operation of example implementations of wireless systems with channel charting functionality as disclosed herein will now be described with reference to FIGS. 3 through 7.

The following notation will be used in describing these illustrative embodiments. Lowercase and uppercase boldface letters stand for column vectors and matrices, respectively. For the matrix A, the Hermitian is $A^H$ and the kth row and lth column entry is $A_{k,l}$ or $[A]_{k,l}$. For the vector a, the kth entry is $a_k$. The Euclidean norm of a and the Frobenius norm of A are denoted by $\|a\|_2$ and $\|A\|_F$, respectively. The M×N all-zeros and all-ones matrix is $0_{M \times N}$ and $1_{M \times N}$, respectively, and the M×M identity is $I_M$. The collection of K vectors $a_k$, k=1, ..., K, is denoted by $$\{a_k\}_{k=1}^K.$$

The real and imaginary parts of the vector a are denoted by $\Re(a)$ and $\Im(a)$, respectively.

The principles of illustrative embodiments of channel charting ("CC") will now be described. As indicated previously, CC is illustratively configured to learn a low-dimensional embedding, the so-called channel chart, from a large amount of high-dimensional CSI of transmitters (e.g., mobile or fixed UEs) at different spatial locations over time. This channel chart locally preserves the original spatial geometry, i.e., transmitters that are nearby in real space will be placed nearby in the low-dimensional channel chart and vice versa. CC will learn whether two transmitters are close to each other by forming a dissimilarity measure between CSI features of these transmitters. Based on this, CC generates the low-dimensional channel chart in an unsupervised fashion from CSI only and without assumptions on the physical channel, i.e., without the aid of information from GNSSs, such as the GPS, triangulation/trilateration techniques, or fingerprinting-based localization methods. This important property enables CC to extract geometry information about the transmitters in a completely passive manner, opening up a broad range of novel applications.

Example 1

In some embodiments, the wireless system comprises a massive MIMO BS with a uniform linear array (ULA) of B=32 antennas receiving data from N=2048 UE locations. We simulate a narrowband, line-of-sight (LoS) channel at a signal-to-noise ratio (SNR) of 0 dB. As will be described in more detail below, an example channel chart generated in such a system uses pairs of transmitters, with each pair being associated with a pairwise spatial distance and a pairwise feature dissimilarity. The channel features are designed to ensure that the pairwise feature dissimilarity is approximately lowerbounded by the pairwise spatial distance (when divided by a suitable reference distance). Thus, UEs that are far apart in space will have dissimilar channel features. In the resulting channel chart, the local geometric features of the original spatial geometry are well-preserved.

In the FIG. 2B embodiment previously described, for simplicity of illustration a single-antenna transmitter (Tx) 201 is shown that is either static or moves in real space. We denote its spatial locations at discrete time instants n=1, ..., N by the set $$\{x_n\}_{n=1}^N$$

with $x_n \in \mathbb{R}^D$, where D is the dimensionality of the spatial geometry (for example the three dimensions representing the UE's x, y, and z coordinates in real space). At each time instant n, the Tx sends data $s_n$ (e.g., pilots or information symbols), which is received at a multi-antenna receiver (Rx) with B antennas; this could be a mMIMO BS. The received data is modeled as $y_n = H(s_n) + n_n$, where the function $H(\bullet)$ represents the wireless channel between the transmitter and receiver, and the vector $n_n$ models noise.

In what follows, we are not interested in the transmitted data but rather in the associated CSI. Concretely, the Rx uses the received data $y_n$ to extract CSI denoted by the vector $h_n \in \mathbb{C}^M$, where M denotes the dimensionality of the acquired CSI from all antennas, frequencies, an/or delays. The generated CSI typically describes AoA, power delay profile, Doppler shift, RSS, signal phase, or simply first and second moments (e.g., mean and covariance) of the received data; typically, we have M>>D. We denote the mapping from spatial location $x_n$ to CSI $h_n$ with the following channel function:

$$\mathcal{H}: \mathbb{R}^D \to \mathbb{C}^M,$$

where $\mathbb{C}^M$ refers to the radio geometry. Clearly, the CSI represented by $h_n$ mainly depends on the Tx's spatial location $x_n$, but also on moving objects within the cell, as well as on noise and interference. For the following description of illustrative embodiments, we make the following assumption:

Assumption 1. We assume that the statistical properties of the multi-antenna channel vary relatively slowly across space, on a length-scale related to the macroscopic distances between scatterers in the channel, not on the small fading length-scale of wavelengths. We further assume the channel function $\mathcal{H}$ to be static, although it is to be appreciated that other embodiments can be extended to time-varying channels.

It should be noted that this and other assumptions referred to herein in describing illustrative embodiments need not apply in other embodiments.

Large-scale effects of channels are considered to be created by reflection, diffraction, and scattering of the physical environment, whereas small-scale effects are caused by multipath propagation and related destructive/constructive addition of signal components. To motivate Assumption 1, we consider the following example, which demonstrates that certain statistical moments of interest for illustrative embodiments indeed capture large-scale effects of the wireless channel.

Example 2

The channel between a single Tx and a B-antenna Rx is modeled with a set of rays and we assume $N_s$ scatterers. We consider a non-LoS (NLoS) scenario for which all rays are in the far field, so that they can be modeled by plane waves. The distance from Tx t to scatterer s is $d_{ts}$, and the distance from scatterer s to Rx-antenna r is $d_{sr}$. The attenuation between two points x and y is modeled by a function of the distance, $a_{xy} = a(d_{xy})$, which absorbs the relevant scatterer cross sections, antenna gains, etc. The distance dependence is typically a power law, and changes in a(d) happen on length scales much larger than the wavelength λ; for conventional ray-tracing, a(d)~$d^{-2}$, corresponding to free-space path-loss. In addition, each scatterer s is modeled by a phase shift $\phi_s$, related to the dielectric properties of the scatterer; these are assigned independent and identically distributed (i.i.d.) random variables for each scatterer. The channel between t and r can thus be modeled as $$h_{t,r} = \sum_{s=1}^{N_s} a_{ts} a_{sr} \exp\left(j\left(\frac{2\pi}{\lambda}(d_{ts}+d_{sr}) + \phi_s\right)\right).$$

When the number of scatterers $N_s \to \infty$, the channel becomes Rayleigh fading. This is a characteristic of the distribution of the absolute value of the channel coefficients, when considered a random variable, where randomness is according to the location of the transmitter within a small scale neighborhood of a few wavelengths. Long term channel characteristics are averaged over this neighborhood. For a mean of a MIMO channel, as a large-scale channel feature that describes the statistics of small scale fading, the pertinent characteristics are thus the mean absolute value of the channel at each antenna r, and the mean relative phase difference between antennas. For the means, averaging over a small scale neighborhood of a few wavelengths, one finds that the wavelength (A) dependence vanishes. For the angular difference, a similar argument leads to the observation that they are large-scale effects of the channel.

Concretely, evaluating the raw $2^{nd}$ moment of the channel from Tx t to Rx antennas r, r' yields $$[\mathbb{E}_\phi[h_t h_t^H]]_{r,r'} = \sum_{s=1}^{N_s}\sum_{s'=1}^{N_s} \mathbb{E}_\phi\left[a_{ts} a_{ts'} e^{j\frac{2\pi}{\lambda}(d_{ts}-d_{ts'})} \times \right.$$
$$\left. a_{sr} a_{s'r'} e^{j\frac{2\pi}{\lambda}(d_{sr}-d_{s'r'})+j(\phi_s-\phi_{s'})}\right]$$
$$= \sum_{s=1}^{N_s} a_{ts}^2 a_{sr} a_{sr'} e^{j\frac{2\pi}{\lambda}(d_{sr}-a_{sr'})},$$

where for clarity, we have considered the expectation over the random phases φ only, assuming that the distances are fixed. In the limit, this expression changes only slowly with the distances $d_{ts}$ through the attenuation function $a_{ts}$. Now consider the (raw) covariance matrix estimated for two transmitters t and t'. If $a_{ts} \approx a_{t's}$ for all scatterers s, then the covariance matrices $R_t$ and $R_{t'}$ are approximately the same. The covariance matrices differ only at length scales where the change in the distances between the transmitter and the scatterers is significant changes in the channel covariance is a large-scale fading effect, driven by the quenched random process that creates the scatterers in the environment.

By relying on Assumption 1, we are ready to detail the CC procedure in illustrative embodiments. CC in these embodiments starts by distilling the CSI $h_n$ into suitable channel features $f_n \in \mathbb{R}^{M'}$ that capture large-scale properties of the wireless channel; here, M' denotes the feature dimension and, typically, we have M'>>D. Additional details regarding design of particular channel features are provided elsewhere herein. We denote the feature extraction stage by the function $$\mathcal{F}: \mathbb{C}^M \to \mathbb{C}^{M'}.$$

Feature extraction mainly serves three purposes: (i) extracting large-scale fading properties from CSI, (ii) distilling CSI into useful information for the subsequent CC pipeline, and (iii) reducing the vast amount of channel data. CC then proceeds by using the set of N collected features $$\{f_n\}_{n=1}^N$$

to learn what is referred to herein as the forward charting function (possibly utilizing side information) in an unsupervised manner. We denote the forward charting function to be learned by $$\mathcal{C}: \mathbb{C}^{M'} \to \mathbb{R}^{D'},$$

which maps each channel feature $f_n$ to a point $z_n \in \mathbb{R}^{D'}$ in the low-dimensional channel chart; typically, we have D'≈D. The objective for learning C is as follows.

The forward charting function C should preserve local geometry between neighboring data points, i.e., it should satisfy the following condition:

$$d_z(z,z') \approx d_x(x,x').$$

Here, x, x'∈$\mathbb{R}^D$ are two points in real space within a certain neighborhood, and z, z'∈$\mathbb{R}$ D' are the corresponding vectors in the learned channel chart. The functions $d_x$(x, x') and $d_z$(z, z') are suitably defined measures of distance (or, more generally, dissimilarity) and the neighborhood size depends on the physical channel.

The goal of CC is to generate a channel chart $$\{z_n\}_{n=1}^N$$

satisfying the distance property above for x and x' in a neighborhood as large as possible. We would like to learn this channel chart solely from the set of N channel features $$\{f_n\}_{n=1}^N$$

in an unsupervised manner, i.e., without using the true spatial locations $$\{x_n\}_{n=1}^N$$

of the UEs.

The assumption that the channel features $$\{f_n\}_{n=1}^N$$

were obtained from a single transmitter (e.g., UE) is not important. In fact, we are merely interested in collecting N channel features from as many locations in spatial geometry as possible. The fact that certain subsets of channel features stem from a single UE can be used as potential side information, which improves the geometric relationships in the learned channel chart.

Figure 3:
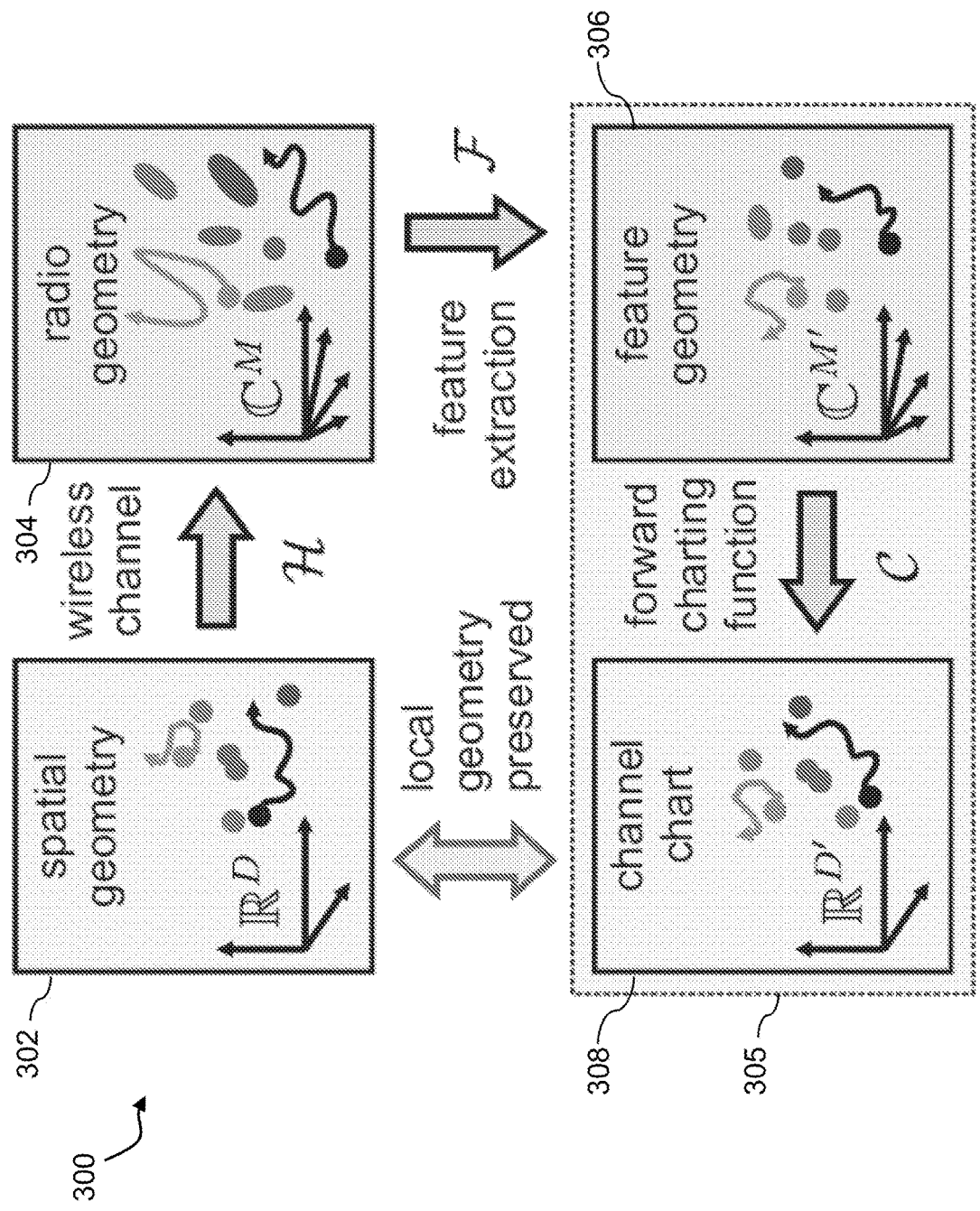
FIG. 3 is a diagram showing relationships between geometries in channel charting in an illustrative embodiment.

FIG. 3 shows a diagram 300 illustrating example geometries involved in CC in an illustrative embodiment. Transmitters Tx are located in a spatial geometry 302 denoted $\mathbb{R}^D$ and a receiver (Rx) extracts CSI in a radio geometry 304 denoted $\mathbb{C}^M$. A charting entity 305 processes a feature geometry 306 denoted $\mathbb{C}^{M'}$ and obtained by feature extraction. The extracted features of the feature geometry 306 are utilized by the charting entity 305 to learn a forward charting function that maps the extracted features into a low-dimensional channel chart 308 characterizing a representational spatial geometry $\mathbb{R}^{D'}$ that preserves the local geometry of the original spatial locations in the spatial geometry $\mathbb{R}^D$.

In the FIG. 3 embodiment, the transmitters are located in the spatial geometry 302 denoted by $\mathbb{R}^D$ (e.g., representing their coordinates). The physical wireless channel H maps data (e.g., pilots and information) into CSI in radio geometry 304 denoted by $\mathbb{C}^M$. This nonlinear mapping into radio geometry obfuscates the spatial relationships between transmitters. The purpose of feature extraction is to find a representation from which spatial geometry is easily recovered. CC then learns—in an unsupervised manner—the forward charting function C that maps the channel features into low-dimensional points in the channel chart 308 of $\mathbb{R}^{D'}$ such that neighboring transmitters (in real-world coordinates) will be neighboring points in the channel chart, i.e., CC preserves the local geometry. Note that in some application scenarios one may be interested in the inverse charting function $C^{-1}$ that maps channel chart information back into feature geometry. For example, with $C^{-1}$, the amount of multipoint CSI required for multipoint transmission and interference alignment can be reduced.

Example 3

An example of how the above-described CC embodiment could be used in practice is as follows. A mobile UE is served by a cellular network, and is connected to a particular BS. Conventionally, cell handover is executed based on RSS measurements performed at the UE. The UE continually monitors synchronization signals transmitted by all BSs in the network, and sends the measurement results to the BS. Handover is then reactively performed, according to these measurements. In a location-based mobility management scenario, to decrease signaling and UE measurements, the network proactively performs handover based on spatial localization of the UE. The user is first localized by fusing ToF and AoA measurements of multiple BSs. Based on the UE location, environment specific information is used to calculate the best cell. In a CC-based approach to cell handover, the BS would have a chart of the radio features in the cell served by it, labeled by locations where handover events have occurred. From uplink pilots transmitted by the UE, it may localize the UE in the radio geometry, and execute handover when the CC indicates a point where handovers happen. Note that in some embodiments of CC, the decision to execute handover is based on measurements at a single BS; network wide fusion is not required, and complexity is therefore reduced relative to conventional approaches. Furthermore, by tracking and predicting a UE's movement in the channel chart, one can even anticipate cell handover events before they happen.

To extract accurate channel charts in an unsupervised manner in illustrative embodiments, we utilize high-dimensional CSI that is from as many distinct transmit locations as possible and acquired at multiple BS antennas over large bandwidths and at fast rates. Fortunately, virtually all modern wireless systems already generate high-dimensional CSI data at extremely fast rates.

Example 4

A BS for 3GPP LTE wireless system measures up to 100 MIMO channels each millisecond, leading to more than $10^{10}$ complex-valued numbers per day for a 2×4 MIMO channel. A similar amount of data is collected by active user equipment instances (UEs), which signal up to 226 bits of CSI to the BS every 2 ms. Currently, most of that data is discarded immediately after use (e.g., for data detection or precoding), with a limited amount kept in order to track the average received signal strength (RSS) of the UEs.

Illustrative embodiments of CC are configured to collect and process the acquired CSI to learn channel charts. The total dimensionality M of each CSI vector is determined by the number of receiver antennas B times the number of subcarriers (or delays) W. As will be described in more detail below, in some embodiments, we intentionally "lift" the CSI vectors into a higher dimensional space, effectively squaring the total feature dimension. We collect channel features from N distinct transmitter locations, which further amplifies the amount of data available for channel charting. Hence, the total number of channel features used for CC can easily be in the billions.

Example 5

Consider a wideband massive MIMO receiver with B=32 BS antennas and W=128 subcarriers, which results in M=BW=$2^{12}$ dimensional CSI vectors. If we lift each CSI vector into an M'=$M^2$ dimensional space, we have features with M'=$2^{24}$ dimensions. By collecting channel features from n=2,048 distinct spatial locations, we have a total dimension of $2^{35}$, which is a dataset containing more than 34 billion complex-valued channel feature coefficients.

Note that these numbers are conservative. 5G wireless networks likely have many more BS antennas and subcarriers, and receive data from a large number of UEs. This torrent of channel features is a blessing and a curse at the same time. Clearly, the CC embodiments disclosed herein will have sufficient data to support unsupervised learning. However, the vast amount of CSI poses severe challenges for storage and processing. Channel feature extraction are therefore illustratively configured to reduce the size of this data, and charting algorithms are illustratively configured to scale appropriately. Additional details regarding these aspects of illustrative embodiments are described below.

A number of quality measures for channel features and channel charts will now be described.

To characterize the usefulness of channel features and the quality of the generated channel charts, we need a measure of how well the channel features or points in the channel chart preserve the spatial geometry of the true transmitter locations—suitable features would preserve the local geometry for a neighborhood as large as possible. To assess the channel charting quality in illustrative embodiments, we utilize two metrics typically used to measure the quality of dimensionality reduction methods, namely continuity (CT) and trustworthiness (TW).

We next explain both of these quality measures in the context of two abstract sets of data points with cardinality N, i.e., $$\{u_n\}_{n=1}^N$$

from an original space and $$\{v_n\}_{n=1}^N$$

from a representation of the original space; the point $v_n$ is said to represent $u_n$. In the CC context, the original space would be the spatial geometry and the representation space can either be the feature geometry or the channel chart (see FIG. 3), depending on whether we want to measure the quality of the channel features or of the learned channel chart.

In what follows, we define the K-neighborhood of a point u as the set containing its K nearest neighbors in terms of the chosen distance (or dissimilarity) function $d_u(u,u')$. The neighborhood of v is defined analogously using $d_v(v, v')$.

With regard to continuity, neighbors in the original space can be far away (dissimilar) in the representation space. In such situations, we say that the representation space does not preserve the continuity of the original point set. To measure such situations, we first define the point-wise continuity for K neighbors of the data point $u_i$. Let $V_K(u_i)$ be the K-neighborhood of point $u_i$ in the original space (but not necessarily in the representation space). Also, let $\hat{r}(i,j)$ be the ranking of point $v_j$ among the neighbors of point $v_i$, ranked according to their similarity to $v_i$. For example, $\hat{r}(i,j)=k$ indicates that point $v_j$ is the kth most similar point to $v_i$. Then, the point-wise continuity of the representation $v_i$ of the point $u_i$ is defined as $$CT_i(K) = 1 - \frac{2}{K(2N-3K-1)} \sum_{j \in V_K(u_i)} (\hat{r}(i,j) - K).$$

The (global) continuity between a point set $$\{u_n\}_{n=1}^N$$

and its representation $$\{v_n\}_{n=1}^N$$

is simply the average over all the point-wise continuity values, i.e., $$CT(K) = \frac{1}{N} \sum_{i=1}^N CT_i(K).$$

Both the point-wise and global continuity measures range between zero and one. If continuity is low (e.g., 0.5 or smaller), then points that are similar in the original space are dissimilar in the representation space. When continuity is large (close to 1), the representation mapping is neighbor preserving.

Continuity measures whether neighbors in the original space are preserved in the representation space. However, it may be that the representation mapping introduces new neighbor relations that were absent in the original space.

Trustworthiness measures how well the feature mapping avoids introducing these kinds of false relationships. Analogous to the point-wise continuity, we first define the point-wise trustworthiness for a K-neighborhood of point $v_i$. Let $\mathcal{U}_K(v_i)$ be the set of "false neighbors" that are in the K-neighborhood of $v_i$; but not of $u_i$ in the original space. Also, let $r(i, j)$ be the ranking of point $u_j$ in the neighborhood of point $u_j$, ranked according to their similarity to $u_i$. The point-wise trustworthiness of the representation of point $u_i$ is then $$TW_i(K) = 1 - \frac{2}{K(2N-3K-1)} \sum_{j \in \mathcal{U}_K(v_i)} (r(i, j) - K).$$

The (global) trustworthiness between a point set $$\{u_n\}_{n=1}^N$$

and its representation $$\{v_n\}_{n=1}^N$$

is simply the average over all the point-wise trustworthiness values, i.e., $$CT(K) = \frac{1}{N} \sum_{i=1}^N CT_i(K).$$

Both the point-wise and global trustworthiness range between zero and one. Low trustworthiness values represent situations in which most data points that seem to be similar in representation space are actually dissimilar in the original space. If the trustworthiness lies close to one, then data points that are close in representation space are also similar (close) in original space.

Since we are interested in preserving local geometry, we set K to 5% of the total number of points N, i.e., K=0.05N. Note that this is a common choice in conventional dimensionality-reduction approaches.

We will use the above-described CT and TW measures for two purposes. First, we will use both measures to assess the quality of channel features $$\{f_n\}_{n=1}^N.$$

For this purpose, we measure CT and TW between the spatial geometry and the feature geometry (see FIG. 3). Additional details are provided below regarding particular channel features that preserve the CT and TW and, hence, are well-suited for use in CC. Second, we will use these measures to assess the quality of the learned channel charts $$\{z_n\}_{n=1}^N.$$

For this purpose, we measure CT and TW between the spatial geometry and the channel chart.

We now focus on the feature extraction stage. Concretely, we show that computing the raw $2^{nd}$ moment of CSI, feature scaling, and transforming the result in the angular domain yields channel features that accurately represent large-scale fading properties of wireless channels.

To limit the search for suitable channel features, we focus on Frobenius (or Euclidean) distance as dissimilarity measure on pairs of features, i.e., we use $d_f(F,F')=\|F-F'\|_F$, where (by abuse of notation) we allow the features to be matrices. To generate suitable channel features, we focus on a second order statistical moment of the received CSI. Let $h_t \in \mathbb{C}^M$ be a vector containing CSI acquired (e.g., during the training phase) at time instant t. We compute the raw $2^{nd}$ moment (R2M) of dimension $M^2$ as follows: $\overline{H}=\mathbb{E}[hh^H]$. Here, expectation is over noise, interference, and potential variations in CSI caused by small-scale motion during short time (i.e., well below the coherence time of the channel). It is important to note that computing the outer product leads to a representation of CSI that is agnostic to any global phase rotation that may stem from small-scale fading. In practice, we compute $$\overline{H} = \frac{1}{T}\sum_{t=1}^{T} h_t h_t^H$$

for a small number (e.g., ten or less) of time instants T. We can then use $\overline{H}$ to extract the necessary channel features in two steps: (i) CSI scaling and (ii) feature transform. Both of these steps are detailed next.

Step 1: CSI Scaling

One of the most critical aspects in the design of good features for CC is to realize that CSI in radio geometry is a poor representation of spatial geometry.

Figure 4:
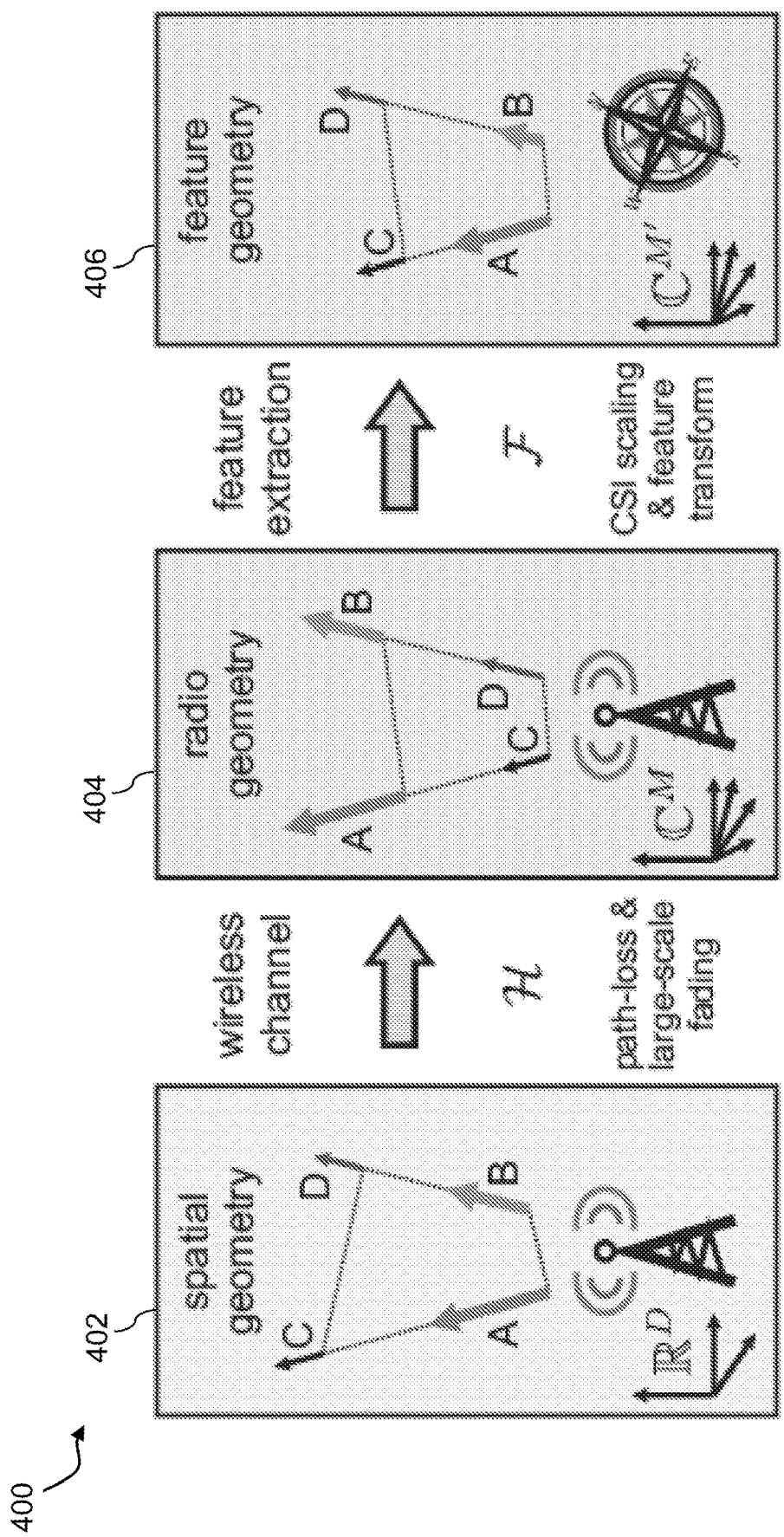
FIG. 4 is a diagram demonstrating importance of CSI scaling during feature extraction in an illustrative embodiment.

FIG. 4 shows a diagram 400 illustrating of the importance of CSI scaling during feature extraction. The diagram 400 shows relationships between a spatial geometry 402, a radio geometry 404 and a feature geometry 406. The solid lines show the dissimilarity between the UEs A and B, as well as C and D in the various geometries 402, 404 and 406. The dotted lines indicate the UEs located on the same incident rays, i.e., A and C, as well as D and B. In radio geometry 404, the acquired CSI misrepresents the true Tx distance due to path-loss. Concretely, UEs far away in spatial geometry appear similar in radio geometry and vice versa. To compensate for this distortion effect, we perform CSI scaling that unwraps radio geometry into feature geometry that better represents a Euclidean space.

Assume with reference to FIG. 4 that the two Txs A and B are close to the Rx, and the Txs C and D are further away. Due to path-loss, the CSI measurements $H_C$ and $H_D$ of Txs C and D appear weaker (i.e., have small Frobenius norm) than those of the Txs nearby, $H_A$ and $H_B$. If we now directly compare the Frobenius distance between C and D, their distance appears to be smaller than that between A and B (because they have small norm), even though they should be further apart. To compensate for this phenomenon, we "unwrap" the CSI so that it is more compatible with spatial geometry, as illustrated in FIG. 4.

This approach is referred to herein as CSI scaling and will now be explained in further detail.

Consider a transmitter that is separated d meters from a ULA with B antennas. Assume a narrowband LoS channel without scatterers and a 2-dimensional plane wave model (PWM). For this scenario, each entry b of the normed (the vector's h phase is rotated so that $h_1$ is real and positive) CSI vector $h \in \mathbb{C}^B$ is given by $$h_b = d^{-\rho}\exp\left(-j\frac{2\pi}{\lambda}\Delta r(b-1)\cos(\phi)\right) \quad (1)$$

for b=1, . . . , B, where $\rho>0$ is the path-loss exponent, $\Delta r$ is the antenna spacing, and $\phi$ is the incident angle of the Tx to the Rx. Let $\overline{H}=hh^H$ be the associated R2M. As in FIG. 4, assume two Txs A and C with the same incident angle $\phi$ but with distances $d_A$ and $d_C$ to the receiver. Our goal is now to scale the CSI matrices so that the Frobenius distance $d_h(\tilde{H}_A, \tilde{H}_C) \|\tilde{H}_A - \tilde{H}_C\|_F$ of the scaled moments $\tilde{H}_A$ and $\tilde{H}_C$ is exactly their true distance. For the above LoS scenario, we have the following result.

Consider the LoS channel model in (1) above. Assume two UEs A and C with the same incident angle $\phi$, with distances $d_A$ and $d_C$ to the BS. It can be shown that, by scaling the R2M of both UEs as $$\tilde{H} = \frac{B^{\beta-1}}{\|\overline{H}\|_F^\beta}\overline{H} \text{ with } \beta = 1 + \frac{1}{(2\sigma)}, \quad (2)$$

the distance $d_h(\tilde{H}_A,\tilde{H}_C)=\|\tilde{H}_A-\tilde{H}_C\|_F$ of the scaled moments $\tilde{H}_A$ and $\tilde{H}_C$ is exactly their true distance $$d_h(\tilde{H}_A,\tilde{H}_C)=|d_A-d_C| \quad (3)$$

if the parameter $\sigma \in (0,\infty)$ matches the path-loss exponent $\rho$.

Since $\beta \geq 1$, CSI from transmitters far away is amplified and nearby CSI is attenuated. In words, feature scaling as in (2) unwraps the radio geometry as illustrated in FIG. 4.

As the path-loss exponent $\rho>0$ is often unknown in practice, we can use the parameter $\sigma$ in (2) as a tuning parameter. For example, simulations indicate that $1 \leq \alpha \leq 16$ yields excellent CC quality (in terms of TW and CT) for various scenarios. Furthermore, as seen from (2), the extreme case of $\sigma \to \infty$ ignores the magnitude of CSI altogether; this is, for example, useful in multi-user systems that deploy transmit-power control or in scenarios in which shadowing effects are dominating.

Step 2: Feature Transform

We are now ready to transform the scaled CSI moments $\tilde{H}$ into channel features. Since we focus on the Frobenius distance as dissimilarity, a straightforward choice of a channel feature is to set the feature directly to the scaled CSI moments $F=\tilde{H}$; we denote this feature by "$\mathbb{C}\{\bullet\}$". However, as described below, applying certain nonlinear transforms to the scaled CSI moments can significantly improve the feature quality. In particular, we also consider taking the entry-wise real part (denoted by "$\Re\{\bullet\}$"), imaginary part (denoted by "$\Im\{\bullet\}$"), angle (denoted by "$\angle(\bullet)$"), or absolute value (denoted by "$|\bullet|$") of the scaled CSI moments. We furthermore say that all these channel features were taken in the antenna domain (denoted by "Ant."). We also consider the case in which we take the scaled CSI vectors and transform them into the angular domain (denoted by "Ang.") followed by one of the nonlinearities mentioned above. For the scaled R2M, denoted by $\tilde{H}$, we compute $D\tilde{H}D^H$, where D is the M×M discrete Fourier transform matrix that satisfies $D^H D=I_M$. This approach transforms the scaled CSI moments from the antenna domain into the angular (or beamspace) domain, which represents the incident angles of the Tx and potential scatterers to the array in a concise way. We then either use this feature directly or apply one of the above mentioned nonlinearities.

We now evaluate the effectiveness of the channel features discussed above. We first detail the simulation parameters, and then evaluate the associated CT and TW measured between spatial geometry and radio geometry.

We consider a scenario involving a narrowband NLoS channel generated from the Quadriga channel model. The key parameters are summarized in Table 1 below. We record CSI of N=2048 randomly selected (with the exception of a limited number of points placed to form a contiguous curve for visual comparison purposes) spatial locations within a square area of 1000 m×500 m; the median distance between nearest neighbors is approximately 7:86 meters, i.e., we sample CSI in space at roughly 53 wavelengths. We acquire CSI at an SNR of 0 dB, average over T=10 time instants, and set σ=16.

It should be noted that the particular channel type, parameters and other features of this scenario and those of other illustrative embodiments disclosed herein are examples only, and are not to be considered limiting in any way.

TABLE 1

Key Parameters of the Quadriga NLoS Channel

| Parameter | Setting |
|---|---|
| Scenario | BERLIN_UMa_NLOS |
| Carrier frequency | fc = 2.0 GHz |
| Channel bandwidth | BW = 312.5 KHz |
| Number of BS Antennas | B = 32 |
| Antenna Array | ULA with Δr = λ/2 |

The global TW and CT for a range of channel features with a neighborhood of K=0.05N are summarized in Table 2 below.

TABLE 2

Comparison of Channel Features Extracted from R2M in Terms of TW and CT

| Domain | | $\mathbb{C}\{\cdot\}$ | $\Re\{\cdot\}$ | $\Im\{\cdot\}$ | $\angle\{\cdot\}$ | $|\cdot|$ |
|---|---|---|---|---|---|---|
| Antenna | TW | 0.76 (±0.11) | 0.62 (±0.12) | 0.70 (±0.09) | 0.67 (±0.09) | 0.54 (±0.07) |
| | CT | 0.76 (±0.07) | 0.71 (±0.07) | 0.69 (±0.08) | 0.63 (±0.08) | 0.56 (±0.09) |
| Angular | TW | See TW above | 0.76 (±0.12) | 0.56 (±0.08) | 0.55 (±0.07) | 0.81 (±0.13) |
| | CT | See CT above | 0.74 (±0.07) | 0.52 (±0.06) | 0.53 (±0.09) | 0.84 (±0.09) |

The numbers in the parentheses in Table 2 indicate the standard deviation over the point-wise TW and CT measures. We see that the absolute value of R2M in the angular domain yields high TW and CT values. Other features, such as the absolute value of the R2M in the antenna domain, perform poorly.

The above-described simulation results indicate that, given appropriate channel features, even challenging NLoS channel scenarios at low SNR exhibit surprisingly high TW and CT. This observation supports the validity of Assumption 1 and the example CC algorithms to be described in detail below. It should be noted that similar simulations were conducted for a "vanilla" LoS (V-LoS) channel as in (1) as well as a Quadriga-based LoS (Q-LoS) channel, and we arrived at the same conclusions. We emphasize that absolute value of the R2M in the angular domain turned out to be the most robust channel feature for all considered channel models and scenarios in these particular illustrative embodiments. However, other types of channel features can be utilized in other embodiments.

We now introduce three distinct CC unsupervised learning algorithms with varying complexity, flexibility, and accuracy. As indicated previously, the three illustrative algorithms to be described include PCA, Sammon's mapping, and autoencoders. For each method, we briefly discuss the pros and cons. Corresponding channel chart results will also be described.

Principal Component Analysis

As a baseline charting algorithm, we perform PCA on a centered version of the channel features. PCA is among the most popular linear and parametric methods for dimensionality reduction and in illustrative embodiments disclosed herein is utilized to map a high-dimensional point set (the channel features) into a low-dimensional point set (the channel chart) in an unsupervised manner. The specific method we use for channel charting is detailed next.

We collect all N channel features, vectorize them, and concatenate them in the M'×N matrix $\underline{F}=[f_1, \ldots, f_N]$. We then normalize each row of $\underline{F}$ to have zero empirical mean; we call the resulting matrix $\bar{F}$. We then compute an eigenvalue decomposition on the empirical covariance matrix of the centered channel features so that $\bar{F}^H\bar{F}=U\Sigma U^H$. Here, the N×N matrix U is unitary, i.e., $U^H U = I_N$, and Σ is a diagonal matrix with the N eigenvalues on the main diagonal sorted in descending order of their value (assuming all eigenvalues are real-valued), i.e., $\Sigma=\mathrm{diag}(\sigma_1, \ldots, \sigma_N)$ so that $\sigma_k \geq \sigma_l$ for $1 \leq k < l \leq N$. Finally, we compute the D'×N matrix containing the low-dimensional points in the channel chart $Z=[z_1, \ldots, z_N]$. Let $u_d$ denote the dth column of U. Then, the channel chart obtained via PCA is given by $$Z_{PCA}=[\sqrt{\sigma_1}u_1, \ldots, \sqrt{\sigma_D}u_{D'}]^H. \qquad (4)$$

PCA is straightforward to implement and can be carried out in a computationally efficient manner using power iterations. However, PCA performs worse in terms of TW and CT than the nonlinear CC methods described below.

Sammon's Mapping

Sammon's mapping (SM) is a classical nonlinear method that maps a high-dimensional point set into a point set of lower dimensionality with the goal of retaining small pairwise distances between both point sets, and is therefore well-suited for use in CC. We next describe SM for CC in detail, explain an efficient algorithm to compute the channel chart, and propose a modified version that takes into account side information (called SM+ in what follows).

Basic aspects of SM will initially be described.

First, we compute a pairwise distance matrix D of all channel features $$D_{n,l}=d_f(F_n,F_l), n=1, \ldots, N, l=1, \ldots, N,$$

where we use the Frobenius distance as described elsewhere herein. SM tries to find a low-dimensional channel chart, i.e., a point set $$\{z_n\}_{n=1}^N$$

that results from the following optimization problem:

$$(SM)\begin{cases} \underset{z_n \in \mathbb{R}^{D'}}{\text{minimize}} \sum_{\substack{n=2,\ldots,N \\ l=1,\ldots,n-1}} D_{n,l}^{-1}(D_{n,l} - \|z_n - z_l\|_2)^2 \\ n = 1, \ldots, N \\ \text{subject to} \sum_{n=1,\ldots,N} z_n = 0_{D' \times 1}, \end{cases}$$

where we omit pairs of points for which $D_{n,l}=0$. The objective function of SM promotes channel charts for which the Euclidean distance of pairs of nearby points in $\mathbb{R}^{D'}$ agrees with the feature distance. Points for which $D_{n,l}^{-1}$ is small (i.e., points that are dissimilar in feature geometry) are discounted; this ensures that SM retains small pairwise distances between both point sets. Since the objective function is invariant to global translations, we use a constraint that enforces the channel chart to be centered in each of the coordinates in $\mathbb{R}^{D'}$.

The problem (SM) is non-convex and typically solved using quasi-Newton methods. We next detail an efficient first-order method that enables us to include side information that is available for CC. We use an accelerated forward-backward splitting (FBS) procedure that solves a class of convex optimization problems of the following general form:

$$\underset{z \in \mathbb{R}^{D' \times N}}{\text{minimize}} f(Z) + g(Z)$$

where the function $$f(Z) = \sum_{n=1}^{K} f_n(z_n)$$

should be convex and smooth and g should be convex, but must not be smooth or bounded. FBS mainly consists of the simple iteration $$Z^{(t+1)} = \text{prox}_g(Z^{(t)} - \tau^{(t)} \nabla f(Z^{(k)}), \tau^{(t)})$$

for $t=1, \ldots, T_{max}$ or until convergence. Here, $\nabla f(Z)$ is the gradient of the smooth function $f$, and the proximal operator for the nonsmooth function g is defined as $$\text{prox}_g(Z, \tau) = \underset{V}{\text{argmin}} \left\{ \tau g(V) + \frac{1}{2} \|V - Z\|_F^2 \right\}.$$

The sequence $\{\tau^{(t)} > 0\}$ contains carefully selected step-size parameters that ensure convergence of FBS.

For CC, the matrix $Z=[z_1, \ldots, z_N]$ contains all points in the channel chart. The function $f$ is chosen to be $$f(Z) = \sum_{\substack{n=2,\ldots,N \\ l=1,\ldots,n-1}} D_{n,l}^{-1}(D_{n,l} - \|z_n - z_l\|_2)^2, \quad (5)$$

and the nth column of the gradient of $f$ is $$[\nabla f(Z)]_n = 2 \sum_{\substack{\ell=1,\ldots,n \\ \ell \neq n}} D_{n,\ell}^{-1}(D_{n,\ell} - \|z_n - z_\ell\|_2) \frac{z_n - z_\ell}{\|z_n - z_\ell\|_2}.$$

The centering constraint in (SM) is enforced by choosing $$g(Z) = \chi\left(\sum_{n=1}^{N} z_n\right),$$

where the "characteristic function" X is zero when its argument $$\sum_{n=1}^{N} z_n$$

is zero, and infinity otherwise. The proximal operator of this characteristic function is simply a reprojection onto the centering constraint given by $$\text{prox}_g(Z, \tau) = Z - \frac{1}{K} Z 1_{N \times 1} 1_{N \times 1}^T.$$

Since the function $f$ is nonconvex, FBS is not guaranteed to find a global minimizer. However, we have found that FBS with a suitable initialization and step-size criterion yields excellent CC results in a computationally efficient manner. Concretely, we initialize FBS with the solution from PCA PCA $Z^{(1)}=Z_{PCA}$ as detailed above and we deploy the adaptive step-size procedure described in T. Goldstein, C. Studer, and R. G. Baraniuk, "A field guide to forwardbackward splitting with a FASTA implementation," arXiv preprint:1411.3406, November 2014, which is incorporated by reference herein.

We now provide an example of how CC can be improved with side information. Note that the methods described here remain unsupervised as they do not require information about the transmitter's spatial locations.

In practice, one often collects many CSI vectors from a single transmitter (e.g., a UE). In this case, the channel features for a given transmitter u form a time series $\{f_n\}n \in N_u$, where $N_u$ contains the temporally ordered channel feature indices associated with UE u. Since transmitters move with finite velocity, we know that temporally adjacent CSI vectors from the same UE should lie close together in the channel chart. To exploit this information, we include a squared $l_2$-norm penalty in the objective function that keeps temporally adjacent points in $N_u$ nearby in the channel chart. Concretely, for each transmitter u, we add $$f_u(Z) = \alpha_u \sum_{n \in N_u} \|z_n - z_{n+1}\|_2^2$$

to the objective of (SM), where the parameter $\alpha_u > 0$ determines the spatial smoothness of transmitter u in the channel chart. The nth row of the gradient of this penalty can be computed effectively and is given by $$[\nabla f_u(Z)]_n = 2\alpha_u((z_n - z_{n+1}) + (z_n - z_{n-1}))$$

for n∈$N_u$. In what follows, we refer to the resulting CC algorithm as Sammon's mapping plus (SM+).

The main advantages of SM/SM+ are that (i) they directly implement the desirables for CC summarized previously, which results in excellent TW and CT, and (ii) temporal side information is easily included. The drawbacks are that (i) they are nonparametric, which would require an out-of-sample extension procedure if new points need to be mapped without relearning the channel chart, and (ii) the complexity is substantially higher than that of PCA.

Autoencoders

Autoencoders (AEs) are single- or multi-layer (deep) artificial neural networks that are commonly used for unsupervised dimensionality reduction tasks and have shown to yield excellent performance on numerous real-world datasets. We now detail how AEs can be used for CC.

The basic idea of an AE is to learn two functions, an encoder $C: \mathbb{C}^{M'} \to \mathbb{R}^{D'}$, and a decoder $C^{-1}: \mathbb{R}^{D'} \to \mathbb{R}^{M'}$, with M'>D', so that the average approximation error $$E = \frac{1}{N}\sum_{n=1}^{N} \|f_n - C^{-1}(C(f_n))\|_2^2 \quad (6)$$

for a set of vectors $\{f_n\}_{n=1}^N$ is minimal. Since the codomain (outputs) of the encoder C is typically of lower dimension than the domain (inputs), we have that $f_n \approx C^{-1}(C(f_n))$; but this is not a perfect equality. The hope is that the AE implements a low-dimensional representation $z_n = C(f_n)$ that captures the essential components of the inputs $f_n$.

We now describe how AEs can be used for CC. First, it is important to realize that the encoder C directly corresponds to the forward charting function with $f_n$ being the inputs; the decoder $C^{-1}$ corresponds to the inverse charting function. Second, we will use multi-layer (or deep) AEs to learn the two functions C and $C^{-1}$ in an unsupervised manner.

Example 6

Consider a simple (shallow) AE whose encoder and decoder consist of a single layer, the inputs are the channel features, and the outputs of the decoder correspond to the points in the channel chart. Each layer first multiplies the inputs with a matrix (containing the weights) and adds a bias term; a (nonlinear) activation function (also known as neuron) is then applied element-wise to generate the outputs.

Mathematically, such a shallow AE is described as follows:

$$C: z = f_{enc}(W_{enc}f + b_{enc}) \quad (7)$$

$$C^{-1}: \hat{f} = f_{dec}(W_{dec}z + b_{dec}) \quad (8)$$

Here, the forward charting function C (the encoder) first computes a matrix-vector product between the weight matrix $W_{enc} \in \mathbb{R}^{D' \times M'}$ and the vectorized channel feature f (the inputs), followed by adding a bias vector $b_{enc} \in \mathbb{R}^{D'}$. The result of this operation is then passed through a nonlinear activation function $f_{enc}$ that operates element-wise on the entries of the argument. The inverse charting function $C^{-1}$ (the decoder) uses another weight matrix $W_{dec} \in \mathbb{R}^{M' \times D'}$ bias vector $b_{dec} \in \mathbb{R}^{M'}$, and activation function $f_{dec}$ to map the input $z \in \mathbb{R}^{D'}$ to the channel feature geometry in $\mathbb{R}^{M'}$.

In practice, one often resorts to multi-layer (or so-called deep) AEs instead of the shallow network discussed in Example 6, as they often yield superior performance for many dimensionality-reduction tasks. For such deep AEs, one simply cascades the inputs and outputs of multiple single-layer networks as in (7) and (8). The key design parameters of such deep AEs are the number of layers L (per encoder and decoder), the dimensions of the weight matrices and bias vectors on each layer, and the activation function types for each layer, all of which can be fixed at design time. During the CC procedure, one jointly learns the entries of the weight matrices $\{W_{enc}^{(l)}, W_{dec}^{(l)}\}$ and bias vectors $\{b_{enc}^{(l)}, b_{dec}^{(l)}\}$, where l=1, . . . , L denotes the layer index, solely from the set of channel features $\{f_n\}_{n=1}^N$ so that the approximation error in (6) is minimal. Learning is typically accomplished by a procedure known as back-propagation, which is computationally efficient and scales favorably to large datasets.

Figure 5:
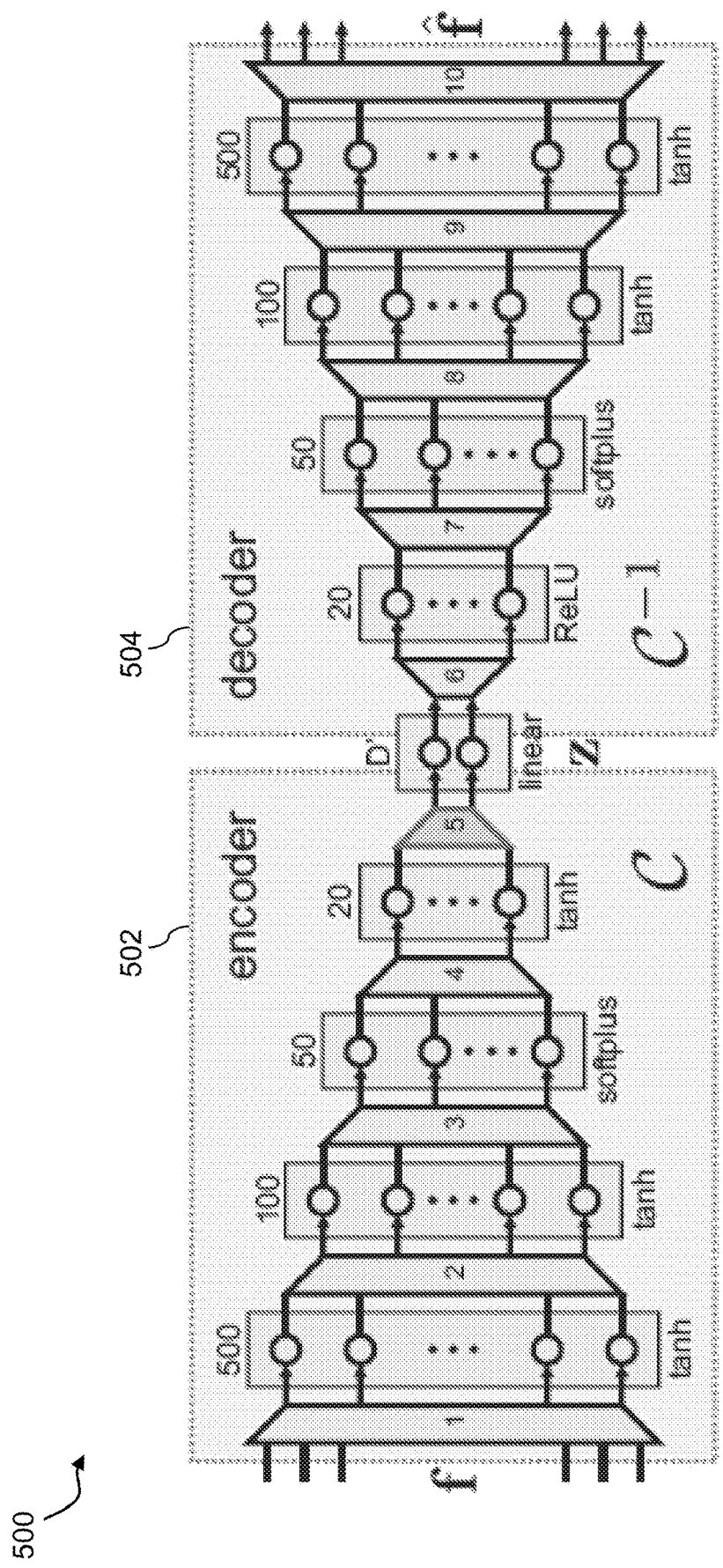
FIG. 5 is a block diagram of an encoder-decoder arrangement utilized to implement channel charting in an illustrative embodiment.

FIG. 5 shows the structure of a deep autoencoder 500 used for CC in an illustrative embodiment. The deep autoencoder 500 comprises an encoder 502 and a decoder 504 arranged as shown. The entire artificial neural network consists of 10 layers; circles correspond to activation functions, trapezoids correspond to the weights and biases; the bottom text indicates the activation function type and the top text the output dimension of each layer. As will be described in more detail below, the deep autoencoder 500 utilizes particular numbers of layers, activation functions, numbers of neurons, and other parameters, carefully selected to provide desired levels of performance in illustrative embodiments, although it is to be appreciated that alternative parameters can be used in other embodiments.

The encoder 502 and decoder 504, also denoted as C and $C^{-1}$ in the figure, each comprise L=5 layers. The inputs of the encoder 502, which implements the forward charting function C, are the M'-dimensional channel features $\{f_n\}_{n=1}^N$, and the outputs of the encoder 502 correspond to points in the D' dimensional channel chart $\{z_n\}_{n=1}^N$. For each layer l, the linear operation with the weights $W_{enc}^{(l)}$ and bias $b_{enc}^{(l)}$ are represented by the trapezoids in FIG. 5. For the layers l={1,2,4}, we set the activation to the hyperbolic tangent function $$f_{enc}^{(l)}(x) = \frac{e^x - e^{-x}}{e^x + e^{-x}}.$$

For layer three, we use the softplus function $f_{enc}^{(3)}(x) = \log(1+\exp(x))$. For layer five, we use the identity $f_{enc}^{(5)}(x) = x$. The numbers of neurons for the respective layers are as follows: $R^{(1)}=500$, $R^{(2)}=100$, $R^{(3)}=50$, $R^{(4)}=20$, and $R^{(5)}=D'$.

The inputs of the decoder 504, which implements the inverse charting function $C^{-1}$, are the points in the channel chart $\{z_n\}_{n=1}^N$ of dimension D', and the outputs of the decoder 504 correspond to estimates of the M'-dimensional channel features $\{\hat{f}_n\}_{n=1}^N$. As shown in FIG. 5, the decoder 504 is essentially a mirrored version of the encoder 502, having the same number of neurons per layer (but in reverse order). The only difference is the activation function on the sixth layer, where we use the rectified linear unit (ReLU) defined as $f_{dec}^{(6)}(x) = \max\{x, 0\}$ instead of a hyperbolic tangent.

Again, alternative numbers of layers, activation functions, numbers of neurons, and other parameters can be used in other embodiments.

To reduce the approximation error of the above-described deep autoencoder and to obtain better TW and CT values, the weights in layer l=5 have been regularized. We include a squared Frobenius-norm regularizer on the entries of $W_{enc}^{(5)}$ (also known as weight decay) by using the following average approximation error:

$$E = \frac{1}{2N}\sum_{n=1}^{N}\|f_n - C^{-1}(C(f_n))\|_2^2 + \frac{\beta}{2}\|W_{enc}^{(5)}\|_F^2$$

where the parameter β>0 was tuned for best performance. For learning of the AE, we use Tensorflow.

The key advantages of AE-based CC compared to PCA, SM, and SM+ are as follows: (i) AEs directly yield a parametric mapping of the forward and inverse channel charting function and (ii) they can be trained efficiently, even for very large datasets. The key drawback is the fact that identifying good network topologies, activation functions, and learning-rate parameters for AEs is notoriously difficult and typically involves tedious and time-consuming trial-and-error efforts by the user.

Simulation results will now be summarized for illustrative embodiments of CC for various channel models and algorithms described above.

As indicated previously, simulations were performed in which we record CSI of N=2048 randomly placed (with the exception of 234 points representing a continuous curve to facilitate visualization) spatial locations within a square area of 1000 m×500 m; the median sampling distance, measured in the spatial domain and between nearest neighbors, is approximately 53 wavelengths. We acquire CSI at an SNR of 0 dB, average noise over T=10 samples, and set ρ=16. We compare results for a "vanilla" LoS channel (V-LoS) as in (1) at a carrier frequency of 2 GHz with λ/2 antenna spacing, and for Quadriga LoS (Q-LoS) and Quadriga NLoS (Q-NLoS) channels (see Table 1 for the model parameters). Since the analysis described herein revealed that the feature configuration {R2M, Ant., |•|} in illustrative embodiments yields the most robust results with respect to CT and TW for all the above channel models, we generated channel charts solely for this channel feature. For each channel chart, we determined the global CT and TW values measured between spatial geometry and the channel chart for K=0.05N nearest neighbors.

We compared the simulation results for V-LoS, Q-LoS, and Q-NLoS channel models, using PCA, SM, SM+ and AE CC algorithms. We found that AE, SM, and SM+ achieve the highest CT and TW, whereas SM+ delivers the most visually pleasing results.

For the learned channel charts for PCA, SM, SM+, and AE, and the three channel models, we obtain CT values between 0:91 and 0:94. This means that the neighborhood of a point in spatial geometry is strongly preserved in the channel charts, i.e., most points nearby in the spatial geometry space are nearby in the channel charts. The TW values are also high, ranging between 0:84 and 0:89; this indicates that most neighbors of a point in the channel charts are also neighbors in spatial geometry.

Additional findings from the simulation results are as follows:

1. PCA yields high CT and TW values for all channel models, and also provides a visually accurate embedding of the spatial geometry. This behavior is due to the fact that we use channel features that well-represent spatial geometry.

2. SM yields superior CT and TW values relative to PCA and provides excellent preservation of the color gradients, especially for the two LoS scenarios.

3. SM+ provides nearly the same CT and TW values as SM, but provides extremely well-preserved embeddings of the channel geometry, even for the challenging Q-NLoS scenario.

4. AE yields high CT and TW values, comparable to those of SM/SM+, but slightly lower CT for Q-NLoS. In addition, the channel charts are less visually pleasing than those of SM+, but demonstrate excellent preservation of local spatial geometry.

To gain additional insight into the quality of the learned channel charts, we performed additional simulations in which we measured the CT and TW values for different neighborhood sizes, i.e., K ranges from 1 to 100. We found that, for the simplistic V-LoS channel, the AE provides the best performance, both in terms of CT and TW; SM and SM+ perform slightly worse, as does PCA. For the more realistic QLoS scenario that takes into account multi-path propagation, the performance of the AE drops significantly, while even PCA performs better. SM and SM+ have, once more, similar performance but perform better than the other two methods. For the most challenging scenario, the Q-NLoS, SM and SM+ perform best, followed by PCA. Evidently, the AE struggles in achieving high CT. This is attributed to the fact that we train the AE only on the N=2048 points. Additional tuning of the neural net architecture and learning rates would likely produce improved AE performance.

To summarize the above-described simulations, AE outperforms the other algorithms in terms of TW, while SM and SM+ perform only slightly worse. In terms of CT, however, AE only works well for simple LoS channels, whereas SM and SM+ perform better for channels generated from the Quadriga model. PCA yields surprisingly good results across the board and performs close to that of SM and SM+ in terms of CT for more challenging channel scenarios (Q-LoS and Q-NLoS).

The above-described CC embodiments provide a novel unsupervised framework to learn a map between CSI acquired at a single BS and the relative transmitter (e.g., UE) locations. Some embodiments extract suitable features from large amounts of high-dimensional CSI acquired at a massive MIMO BS, followed by CC algorithms that utilize dimensionality reduction and/or manifold learning. The illustrative embodiments include four distinct CC algorithms (PCA, SM, SM+, and AE), with varying complexity, flexibility, and accuracy that produce channel charts that preserve the local geometry of the transmitter locations for a range of realistic channel models. Since channel charting in these embodiments is unsupervised, i.e., does not require knowledge of the true user locations, such embodiments can be utilized in numerous applications relevant to 5G networks, including but not limited to rate adaptation, network planning, user scheduling, handover, cell search, user tracking, user grouping for device-to-device (D2D) communication, beam prediction for mmWave or terahertz systems, and other cognitive tasks that rely on CSI and UE movement relative to the BS.

As mentioned previously, these and other embodiments disclosed herein are presented by way of illustrative example, and numerous alternative embodiments are possible.

For example, additional illustrative embodiments to be described below provide representation-constrained autoencoders, as well as associated applications in wireless positioning and other related functionality in wireless system. Although these additional embodiments are described below primarily in the context of autoencoders, it will be readily apparent to those skilled in the art that the disclosed arrangements can be adapted in a straightforward manner for use with other dimensionality reduction techniques of the type disclosed herein.

Some of these additional embodiments are configured to exploit partial location information, i.e., for some of the channel features we know the associated location. This information helps to pin down entries in the channel chart which improves positioning performance. With this adjustment, the method would be semi-supervised (as some data points are now labeled).

Additionally or alternatively, we can include certain side information that stems from the CSI measurement process. For example, if the system is following a user that is moving in space, we can group the CSI obtained from this user. When learning the channel chart, we know that the associated points in the low-dimensional channel chart must be nearby since the user can only move with finite velocity. This approach in some implementations is illustratively configured to utilize information from the measurement process but does not directly utilize location information from the UEs.

These and other techniques can be used in illustrative embodiments to generate channel charts of the type disclosed herein, in some cases exhibiting various performance improvements relative to one or more of the arrangements previously described.

As indicated above, certain applications provide additional constraints or side information that can be imposed on the low-dimensional representations. Such side information may stem either from the dataset itself or from the application (e.g., from the way data was collected). One example arises when data is acquired over time. In such a scenario it may be natural to enforce constraints between representations by exploiting the fact that for temporally correlated data points, the associated low-dimensional representations should exhibit a certain degree of similarity. Another example arises in situations in which a subset of the representations are known a-priori, e.g., when a subset of training data is annotated. The obtained annotation information can then be translated into representation constraints, which leads to embodiments with semi-supervised training of AEs.

One example application in which representation constraints are important relates to positioning of users in wireless systems in conjunction with CC embodiments of the type described elsewhere herein. As mentioned previously, CC in some embodiments measures high-dimensional CSI of users transmitting data to a wireless access point or cell tower. By collecting CSI over time, one can train an AE for which the low-dimensional representations reflect relative user positions. Such techniques enable logical (or relative) localization without access to GNSSs and without expensive measurement campaigns.

These and other embodiments are illustratively configured to utilize various types of side information that may be available. For example, users can only move with finite velocity. One could include this information when training an AE to ensure that temporally correlated data points are nearby in the representation space. In addition, certain points in space with known location (e.g., a coffee shop) can be associated with measured CSI; this helps to pin down a small set of spatial locations in the representation space, which may enable absolute positioning in space. Accordingly, by enforcing constraints between representations, one can improve the efficacy of AEs and enable interpretability of the learned low-dimensional representations.

In the embodiments to be described, four distinct example representation constraints for AEs are provided, as well as a framework for including such representation constraints during training. We propose constraints on pairs of representations in which either the absolute or relative distance among (a subset of) representations is enforced. We formulate these constraints as nonconvex regularizers, which can easily be included into existing deep-learning frameworks. Our simulations indicate that only a small amount of representation constraints are required to (often significantly) improve the representation quality of AEs. As a byproduct of our framework, we show that one of the proposed constraint types enables one to learn a parametric version of Sammon's mapping that avoids the need of costly out-of-sample extensions. Representation constraints as disclosed herein are highly effective for the above-noted application of CC-based positioning in wireless systems, and similar advantages can be provided in numerous other applications involving CC. Accordingly, combining partially-annotated data points with temporal constraints that arise from the acquisition process can significantly improve the positioning performance of certain CC embodiments.

Certain embodiments to be described extend AEs with representation constraints that further improve performance in certain applications. For example, wireless positioning provides a unique set of representation constraints originating from the acquisition process, at least a subset of which can be incorporated into AEs so as to enable significantly improved CC performance and to facilitate exact positioning via CC.

Before describing example representation constraints for AEs, we describe some additional aspects of AEs in illustrative embodiments, in order to introduce the further description. It should be understood that the notation used in the following description differs from that used elsewhere herein. For example, certain variables referred to in the context of other embodiments described above are used in a different manner in the following description of the representation constraints for AEs.

Such AEs in the illustrative embodiments to be described are assumed to take a high-dimensional dataset consisting of N data points (vectors) $x_n \in \mathbb{R}^D$, $n=1, \ldots, N$, of dimension D, and learn two functions: the encoder $f^e: \mathbb{R}^D \to \mathbb{R}^{D'}$ and the decoder $f^d: \mathbb{R}^{D'} \to \mathbb{R}^D$. The encoder maps data points onto low-dimensional representations $y_n \in \mathbb{R}^{D'}$, $n=1, \ldots, N$, where $D' \ll D$ is the dimension of the representations, and the decoder maps representations back to data points, i.e., we have $$y_n = f^e(x_n) \text{ and } x_n = f^d(y_n), n=1, \ldots, N.$$

The encoder and decoder functions of AEs are implemented as multilayer (shallow or deep) feed-forward neural networks that are illustratively trained to minimize the mean-square error (MSE) between the input and the output of the network. Specifically, one seeks to minimize the following loss function:

$$L(W^e, W^d) = \frac{1}{N} \sum_{n=1}^{N} \|x_n - f^d(f^e(x_n))\|^2. \quad (1')$$

Here, the parameters to be learned from the dataset $\{x_n\}_{n=1}^{N}$ are the weights and bias terms contained in the sets $W^e$ and $W^d$ that define the neural network forming the encoder and decoder, respectively. All norms used in this paper are $l_2$-norms. While training of AEs is notoriously difficult, numerous strategies known to those skilled in the art can be used to improve the quality of training and reduce the probability of getting stuck in local minima.

The D'-dimensional output of the encoder $f^e$ is typically of lower dimension than the intrinsic dimension of the manifold embedding the inputs $x_i$ in D dimensions. Hence, we have that $x_n \approx f^d(f^e(x_n))$, $n=1, \ldots, N$, unless the dataset $\{x_n\}_{n=1}^N$ was D'-dimensional and we were able to learn the underlying structure. Nevertheless, AEs often find low-dimensional representations $\{y_n\}_{n=1}^N$ with small loss that capture the intrinsic dimensionality of the input data vectors.

We now describe four distinct example representation constraints, which are summarized in Table 3 below. In what follows, underlined quantities represent constant scalars or vectors that are known a-priori and used during AE training. Non-underlined quantities are optimization variables.

TABLE 3

Summary of Example Representation Constraints for AEs

| Name | Constraint | Regularizer |
|---|---|---|
| Fixed absolute distance (FAD) | $\|y_i - \underline{y}_j\| = \underline{d}_{i,j}$ | $(\|y_i - \underline{y}_j\| - \underline{d}_{i,j})^2$ |
| Fixed relative distance (FRD) | $\|y_i - y_j\| = \underline{d}_{i,j}$ | $(\|y_i - y_j\| - \underline{d}_{i,j})^2$ |
| Maximum absolute distance (MAD) | $\|y_i - \underline{y}_j\| \le \underline{d}_{i,j}$ | $\max\{\|y_i - \underline{y}_j\| - \underline{d}_{i,j}, 0\}^2$ |
| Maximum relative distance (MRD) | $\|y_i - y_j\| \le \underline{d}_{i,j}$ | $\max\{(\|y_i - y_j\| - \underline{d}_{i,j}, 0\}^2$ |

The fixed absolute distance (FAD) and fixed relative distance (FRD) constraints enforce a known distance $\underline{d}_{i,j}$ on a pair of representations according to $\|y_i - y_j\| = \underline{d}_{i,j}$. The difference between the FAD and FRD constraints is that for FAD one of the two representations, e.g., $\underline{y}_j$, is a constant known prior to AE learning (i.e., not to be confused with a representation in the dataset); for FRD, both representations $y_i$ and $y_j$ are optimization variables. To ease the inclusion of these constraints in deep learning frameworks, we propose to use regularizers (see Table 3) for which generalized gradients exist. Concretely, the generalized gradient of the FAD and FRD constraints with respect to representation $y_i$ is $$\nabla_{y_i} (\|y_i - y_j\| - d_{i,j})^2 = 2(\|y_i - y_j\| - \underline{d}_{i,j}) \frac{y_i - y_j}{\|y_i - y_j\|}, \quad (2')$$

where the representation $\underline{y}_j$ is known for FAD. If $\underline{d}_{i,j}=0$, then the FRD regularizer promotes the two representations $y_i$ and $y_j$ to be equal, whereas the FAD regularizers will try to learn a representation $y_i$ that is close to the constant vector $\underline{y}_j$. Intuitively, the FAD constraint for $\underline{d}_{i,j}=0$ acts as a semi-supervised extension in which one knows parts of the representations a-priori.

It should be noted that the FRD regularizer resembles that of Sammon's mapping described elsewhere herein. In fact, it can be shown that, by including FRD regularizers on all data vectors one can train a parametric AE version of Sammon's mapping if we multiply a factor of $d_{i,j}^{-1}$ to each FRD regularizer term.

The maximum absolute distance (MAD) and maximum relative distance (MRD) constraints enforce a maximum a-priori known distance $\underline{d}_{i,j}$ between a pair of representations according to $\|y_i - y_j\| \le \underline{d}_{i,j}$. For MAD, one of the two vectors in the constraint, e.g., $\underline{y}_j$, is a constant that is known a-priori; for MRD, both representations are learned. We include these constraints as regularizers (see Table 3) with the generalized gradient $$\nabla_{y_i} \max\{\|y_i - y_j\| - d_{i,j}, 0\}^2 = 2\max\{\|y_i - y_j\| - \underline{d}_{i,j}, 0\} \frac{y_i - y_j}{\|y_i - y_j\|}. \quad (3')$$

where $\underline{y}_j$ is known for MAD. As will become apparent, maximum distance regularizers often yield superior results to their fixed-distance counterparts as they leave the AE more "freedom" while learning representations. Note, when $d_{i,j}=0$ the FAD, MAD, FRD, and MRD are all equivalent.

We implemented a stochastic optimizer to minimize the sum of the AE fidelity term (1') and the regularized constraint penalties using the Keras machine learning framework. Because penalty terms may represent pairwise constraints that involve two data points, the stochastic approximation of the regularizers was formed by randomly sampling constraints rather than data points.

To improve numerical robustness for the generalized gradients in (2') and (3'), we use the approximation $$\frac{y_i - y_j}{\|y_i - y_j\|} \approx \frac{y_i - y_j}{\rho + \|y_i - y_j\|},$$

where $\rho \ge 0$ is set to a small constant.

In addition to measuring the local-neighborhood-preservation properties via TW and CT, we also consider Kruskal's stress (KS), which measures how well the global structure in the high-dimensional dataset $\{x_n\}_{n=1}^N$ is mapped to the low-dimensional embedding $\{y_n\}_{n=1}^N$. The KS is in the range [0, 1] and smaller values indicate that global structure is preserved better. If KS=0, then the structure is perfectly preserved.

Simulations were performed using the same AE topology for all datasets and constraints.

The AE consists of three hidden layers for the encoder and the decoder (each layer has 9, 7, and 3 neurons with rectified linear units). The encoder output that extracts the representation consists of 2 neurons with linear activation functions. The datasets are generated using well-known conventional techniques. For each dataset, we generate N=5000 points and we add i.i.d. zero-mean Gaussian noise with variance $\sigma^2=0.05$.

The results indicate that for most of the datasets considered, the TW, CT and KS improves by adding as little as 1% representation constraints. The relative constraints often outperform their absolute counterparts; we attribute this to the fact that relative constraints allow the AE more "freedom" to learn a representation. Furthermore, we found that fixed constraints generally outperform maximum constraints.

An alternative approach to imposing representation constraints can be used in other embodiments. We note that the datasets themselves provide tentative distances in the representation set, and incorporate these as Sammon's mapping constraints to the AEs. For this, we use FRD regularizers, scaled with corresponding factors of $\underline{d}_{i,j}^{-1}$ as described above. Simulations were performed for such Sammon's-enhanced AEs trained using the same datasets used previously and TW and CT values were determined for K=250 (5% of the dataset). It was found that AEs extended with the capabilities of Sammon's mapping are able to almost perfectly unfold the manifolds underlying each dataset, with certain exceptions for particular datasets. Note that the proposed representation constraints are obtained directly from the dataset itself and enable the design of a parametric version of Sammon's mapping that advantageously avoids out-of-sample extension.

We now describe an application example of representation constraints in wireless positioning. In particular, we augment illustrative embodiments of CC for unsupervised user positioning with representation constraints that naturally arise from the data and application itself. As described elsewhere herein, CC in some embodiments measures CSI from users at different spatial locations and learns a low-dimensional channel chart that preserves locally the original spatial geometry. More particularly, users that are nearby in physical space will be placed nearby in the channel chart and vice versa-global geometry is not preserved. In this framework, high-dimensional features are extracted from CSI, then processed with dimensionality-reduction methods to obtain the low-dimensional channel chart. Illustrative embodiments of CC operate in an unsupervised manner, e.g., learning is only based on CSI that is passively collected at an infrastructure BS (and required anyway for data detection and precoding) but from multiple user locations in the service area over time. CC advantageously facilitates a wide variety of location-based applications in wireless systems as it provides BS providers with relative user location information without access to GPS or fingerprinting methods that require expensive measurement campaigns.

In some of the CC embodiments previously described, SM and AEs were used to learn the channel charts. While SM exhibited good performance, AEs scale well to large problem sizes and provide a parametric mapping that enables one to map new, unseen CSI features to a relative location information. In addition to these advantages of AEs, valuable side information that arises from the application itself can also be used as representation constraints for AEs. In contrast to SM, conventional AEs do not enforce any geometric structure on their representations. However, by tracking a user's CSI over time, the corresponding low-dimensional representations that reflect the user's position should be similar as velocity is limited.

Accordingly, some illustrative embodiments impose MAD constraints on pairs of representations from a user over time in order to ensure that nearby spatial locations for nearby representations. We can estimate an upper limit on the maximum distance in representation space dependent on the measurement CSI acquisition times. Note that this information comes from the CSI measurement process and the fact that we know how data was collected in a real system. This approach utilizing MAD constraints remains passive as no supervision or measurement campaigns are necessary.

Furthermore, to enable true positioning capabilities with CC, we unwrap the channel chart using what we call anchor vectors, i.e., points in space for which we know both their CSI as well as their true location. One can imagine measuring CSI at a small set of locations when setting up a new BS. With this information, we can impose FAD representation constraint on the AE with $\underline{d}_{i,j}=0$ to enforce the exact anchor positions. We note that the inclusion of such constraints leads to a semi-supervised version of CC (and AEs in general) and requires minimal measurement campaigns. We emphasize, however, in contrast to conventional fingerprinting methods that are fully supervised and require training at wavelength resolution in space, we only require a small number of anchor vectors and use the rest of the (unlabeled) data to improve the localization accuracy of the channel chart.

Simulations were for illustrative embodiments of CC with representation constraints were performed and compared to the corresponding simulations of those CC embodiments as described elsewhere herein without representation constraints. We found that utilizing only a small fraction of representation constraints can yield significant improvements in terms of TW, CT and KS. We also found that there is a tradeoff with respect to neighborhood-preserving properties. More concretely, an increase in TW means that we are introducing less "fake" near neighbors; a reduction in CT means that original neighborhoods in the original space are not as well preserved in the channel chart as before. With respect to the global geometric structure, we found that KS significantly improves for all representation-constrained AEs; this implies that the inclusion of constraints enables us to recover global geometry. This is particularly true in the simulation results for AEs that include both FAD constraints (anchor vectors) and MAD constraints (to enforce continuity of a user's motion over time). Finally, we found that the propagation conditions do not substantially affect the performance of CC.

As is apparent from the foregoing, some illustrative embodiments use side information on user motion and anchor vectors to improve the positioning performance of CC. Numerical results for the example positioning application have shown that the use of representation constraints that are readily available in wireless positioning scenarios can yield significant improvements in recovered global geometry.

In other embodiments, additional geometric constraints may be included, e.g., when acquiring CSI from multiple cell-towers or access points.

Again, although the representation constraints are described primarily in the context of AEs, similar techniques can be applied using other types of dimensionality reduction, including those described elsewhere herein.

Figure 6:
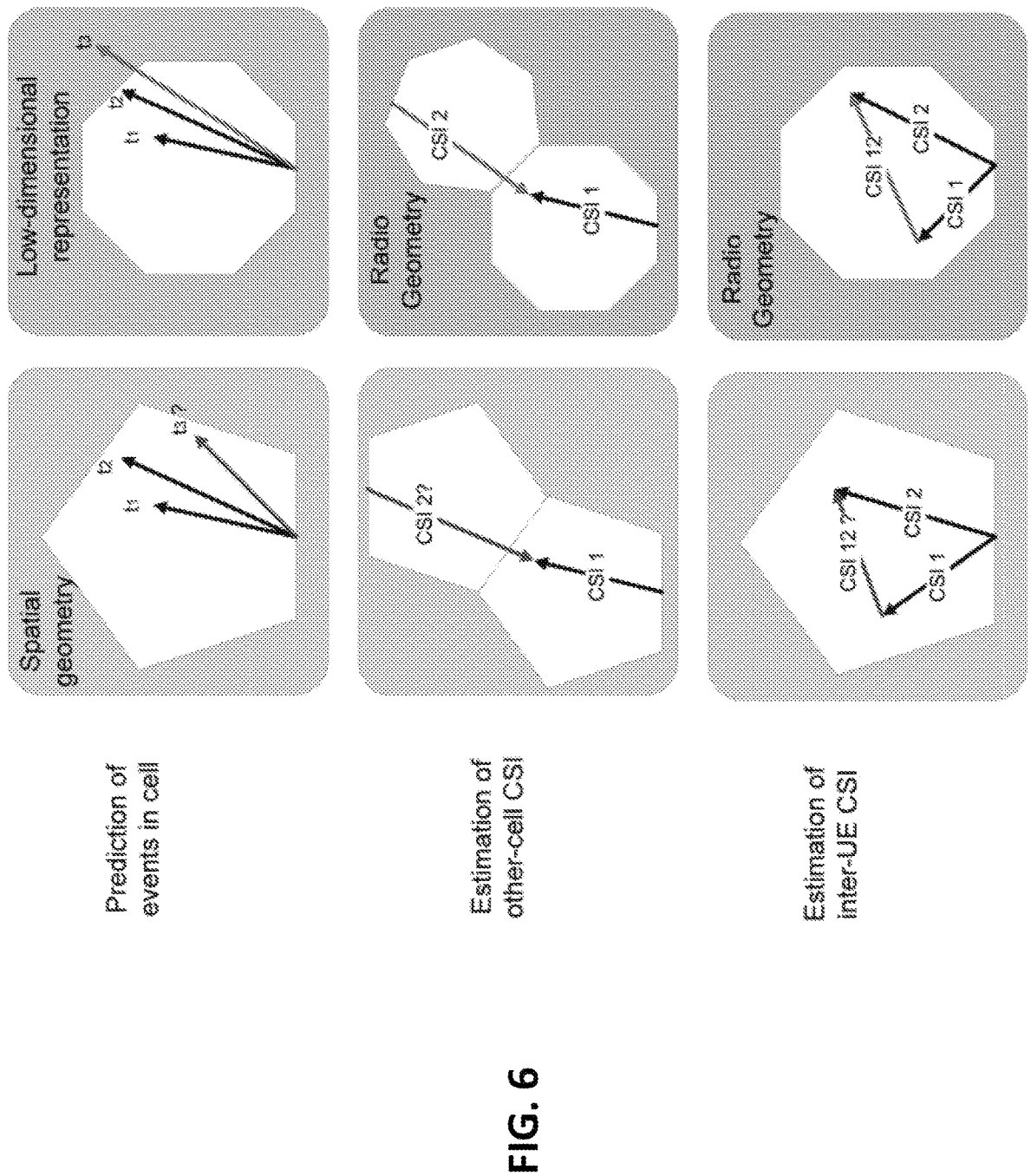
FIG. 6 illustrates three example uses of channel charting in respective embodiments.

Referring now to FIG. 6, a number of example uses of channel charting in illustrative embodiments are shown. These are considered illustrative examples of arrangements in which a channel chart generated in the manner described above is utilized to estimate at least one position-related characteristic of one or more wireless devices in an actual spatial geometry of a wireless channel.

In the upper portion of the drawing, an example is shown of prediction of events in a cell of a wireless system, such as predicting when a particular wireless device will leave that cell. This more particularly includes in the present example estimating positional information of a given wireless device. At times $t_1$ and $t_2$, a wireless device (e.g., a UE) is at particular locations within the spatial geometry of a given cell. These correspond to respective points in a low-dimensional representation provided by the channel chart. The prediction of an in-cell event in this example illustratively involves predicting where the wireless device will be at a future time $t_3$ using the low-dimensional representation provided by the channel chart. As illustrated, this illustratively involves a prediction based on the channel chart that the wireless device will have left the given cell at time $t_3$.

In the middle portion of the drawing, an example is shown of estimating CSI between the given wireless device and one or more base stations in one or more cells of the wireless system other than a current cell of the given wireless device. This is an example of what is referred to in the drawing as estimation of other-cell CSI, and includes supplementing CSI 1 from a first cell that currently includes the given wireless device with estimated other-cell CSI 2 from a second cell other than a current cell of the given wireless device. The estimated other-cell CSI 2 is determined using the channel chart.

In the lower portion of the drawing, an example is shown of estimating CSI between the given wireless device and at least one other wireless device, illustratively within the same cell of the wireless system. This is an example of what is referred to in the drawing as estimation of inter-UE CSI, and includes supplementing CSI 1 and CSI 2 of respective first and second wireless devices in a given cell with inter-UE CSI 12 of the second wireless device due to the first wireless device. The estimated inter-UE CSI 12 is determined using the channel chart.

In some estimation scenarios such as those depicted in FIG. 6, utilizing the channel chart to estimate at least one position-related characteristic of one or more wireless devices in an actual spatial geometry of the wireless channel illustratively comprises extracting additional channel features from additional CSI characterizing the radio geometry of the wireless channel, comparing the additional channel features to the channel chart, and estimating the position-related characteristic based at least in part on a result of the comparing.

A wide variety of other use cases within wireless systems can be implemented using channel charts generated in the manner disclosed herein.

For example, in some embodiments channel charts generated in the manner disclosed herein are utilized for RAN optimization or for facilitating other types of RAN management functionality.

In some embodiments, network event anticipation charting can be used to anticipate events in the network. Once a BS has a channel chart, it can approximatively locate a user in the chart. Flagging the chart based on previous events in the cell, such as handover to a given neighboring cell, the BS can identify upcoming events, e.g. when a user is moving towards another cell. Thus, the network can proactively prepare for events, such as handover, when observing that the user is moving in the chart towards points which are flagged with handover events to this neighboring cell. This would be a particularly good solution in ultra-reliable communication, where communication breakups can be anticipated, and reliability can be guaranteed with proactive action.

A network can also proactively schedule traffic to user, when it anticipates, based on a channel chart, that the user is moving towards a location with bad coverage. Alternatively, scheduling may be postponed, when the network anticipates, based on the channel chart, that the user is moving towards a location with high data rate coverage, like a small cell, or a WiFi hot spot. In these and other applications, a charting function can be used to anticipate events without any other measurements than the feature extraction at the serving BS, and the related processing of the channel chart. Using multi-point charting, the precise quality of the channel to the other cell can also be predicted.

In an mmWave network, a mobile user has to find not only a neighboring cell, but the neighboring beam as well. In a BS with a high number of antennas, a high number of narrow beams have to be transmitted so that mobile users can find the cell, and the beam. A conventional solution would be to select a set of beams, and transmit with them, one at a time, hoping that a user approaching the cell finds one of these beams. With channel charting, a donor BS observes that a user is moving towards the cell border, and towards points in the chart where users have earlier handed over to a specific target cell. In a beam-based cell search method, the BS would in addition flag the chart with the beam in the target cell that the users have handed over to. Now, the donor knows both the target cell, and the beam in the target cell, without any neighbor-cell measurements. The network can use this to activate only certain beams for transmission in the target cell—the ones that the target cell knows that a user is moving into from the donor cell. Here channel charting was used to provide CSI that was not otherwise available, as transmissions are not needed to get the beam identity in the target cell.

Channel charting can also be used for precise identification of locations of small cells or WiFi access points. Such arrangements can be directly used for integrated multiband operation. An umbrella macro cell providing coverage can determine, from a labeled channel chart, when a secondary smaller cell is connection is available, without excessive measurements on the high frequency carrier of the small cell. Similarly, in CP/UP separation, a control plane connection would be kept to the umbrella macro cell, which would use labeled charting to determine which cell the user plane would be served from. Considering separated uplink and downlink, the needed multipoint CSI can again be anticipated from a multi-point channel charting function, without excessive measurements.

Channel charting can be similarly used to manage BS activity. For example, if BSs have been switched off to save energy, there is no information available for the network to accurately estimate whether it would be beneficial to switch on a BS. Consider the situation where there is a cell A covering a wide area, and a small cell B that is shut off within the coverage area of A. With channel charting, BS A would know that certain users are in the area of the cell, where they would be served by B if it were switched on. With multi-point channel charting, BS A would even know the channel quality between such users and BS B, effectively estimating CSI that is not otherwise available. Based on this information, the network could estimate whether it is beneficial to switch on BS B that had been shut off for network energy efficiency.

In other embodiments, channel charting as disclosed herein is utilized to implement inter-cell interference alignment and cancellation (ICIAC). ICIAC are network-wide physical layer optimizations that have not been espoused by the industry due to the perceived cost in acquiring CSI. However, channel charting as disclosed herein can be used to supply the needed information. It should be noted in this regard that interference alignment and interference cancellation have opposite targets. In interference alignment, interference to certain subspaces of the receiver is minimized, leaving interference-free partial channels to the user. For interference cancellation, it is important that the interference victim receives the dominant interfering signal on a stronger channel than the desired signal, to enable cancellation. Channel charting renders a combined view of these approaches feasible in practice.

Massive MIMO technology brings both challenges and opportunities into interference considerations. On the one hand, the processing/implementation complexity increases due to necessity of big data management. On the other hand, very high-dimensional antenna arrays ensure highly directional channel vectors, which can be modeled by Gaussian vectors with a small number of dominant eigenvectors (e.g., of corresponding Wishart matrices). Thus, massive MIMO ensures directional beamforming that enables simultaneous spatial multiplexing of intended users and mitigating interference to non-intended ones. This can be done via nulling of some spatial directions. With the use of channel charting information as disclosed herein, nulling can be more effectively performed based on knowledge of mean and covariance information of the interference channels.

Subject to the available CSI, users may be allocated to sets of base stations, within which ICIAC is performed. Resources are allocated to the logical entities controlling these sets. A column generation approach may be used to find the set of active logical entities, based on metrics derived from channel charting functions.

An ICIAC technique can be viewed as a control algorithm of a complex dynamic system. Operating such a system reliably and efficiently assumes controllability (i.e., an ability to move a wireless network into a target state via appropriate control actions) and stability (i.e., robustness to perturbations). Under imperfect input data, networks may become uncontrollable and/or unstable. Thus, analyzing of controllability and stability of ICIAC algorithms with imperfect and/or incomplete CSI as represented by the channel charting functions is important for network management.

Channel charting in illustrative embodiments can also be used to facilitate multiconnectivity in mmWave networks. Multiconnectivity is beneficial in mmWave networks due to spotty coverage and blocking by, e.g., human bodies. Pathloss in mmWave frequencies is estimated to be 20 dB higher in NLoS channels than in LoS channels. For this reason, multiconnectivity is crucial for reliable mmWave connections in regions where a user is in a cell boundary region, where a blocking event may destroy service. Consider by way of example a continuous coverage ultra-dense network (UDN) mMIMO mmWave tier, where multiconnectivity is applied to guarantee service continuity. Multiconnectivity in mmWave networks is further complicated by the extreme angular selectivity of mMIMO mmWave arrangements. If a UE close to a cell boundary is blocked by a human body or other obstruction from cell i, the channel towards cell j may be reasonably good, but the channel towards cell i may be so weak that preparations for handover are impossible. If the blocking configuration suddenly changes, the situation may be reversed.

In illustrative embodiments, this issue is addressed by using a multi-point charting function. The charting function enables multiconnectivity, as CSI towards both i and j is known irrespective of the blocking condition. Note that in this case, blocking probability is part of the feature space considered by the charting functions.

Some embodiments are configured such that a network is managed as a user-centric collection of intersection graphs provided by channel charting. For each user, there is an active set of BSs, and beam in those BSs. Each active set is managed by a logical controller, which controls how the user is served.

The foregoing are only examples of RAN optimizations and other network management functions that are facilitated through the use of channel charting as disclosed herein, and numerous other use cases are possible.

Figure 7:
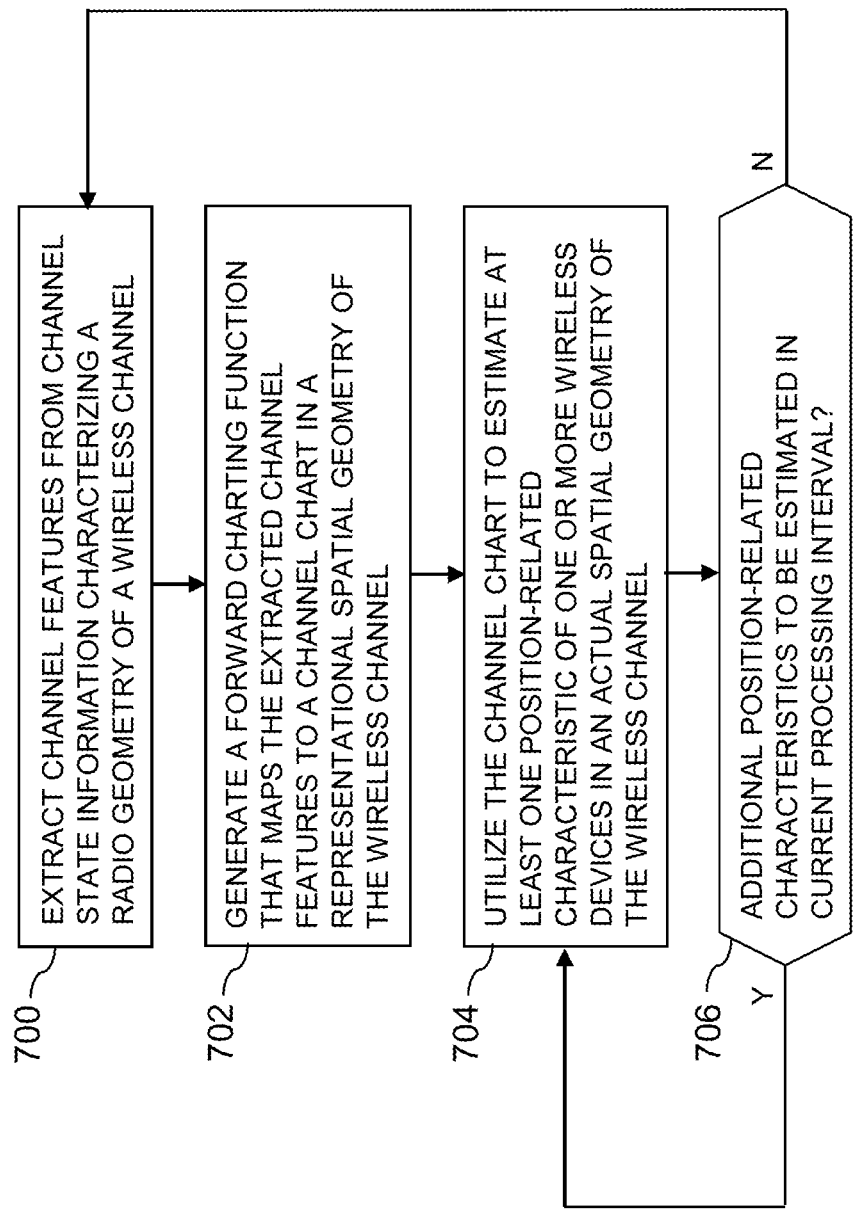
FIG. 7 is a flow diagram of a process for channel charting in an illustrative embodiment.

FIG. 7 shows an exemplary process, illustratively implemented at least in part utilizing a charting entity, such as charting entity 205 of FIG. 2B or charting entity 305 of FIG. 3, possibly implemented as at least a portion of a processing platform such as processing platform 104 of the FIG. 1 embodiment. It is to be understood that this particular process is only an example, and additional or alternative processes can be performed at least in part by channel charting entities comprising wireless system components or other types of processing platforms in other embodiments.

In this embodiment, the process illustratively comprises steps 700 through 706. As noted above, at least portions of these steps are assumed to be performed at least in part by a channel charting entity of the type described elsewhere herein.

In step 700, channel features are extracted from CSI characterizing a radio geometry of a wireless channel.

In step 702, a forward charting function is generated that maps the extracted channel features to a channel chart in a representational spatial geometry of the wireless channel.

In step 704, the channel chart is utilized to estimate at least one position-related characteristic of one or more wireless devices in an actual spatial geometry of the wireless channel.

In step 706, a determination is made as to whether or not there are one or more additional position-related characteristics to be estimated in a current processing interval. If there is at least one such position-related characteristic to be estimated in the current processing interval, the process returns to step 704 to utilize the channel chart to estimate the one or more position-related characteristics to be estimated. Otherwise, the process returns to step 700 to extract channel features from additional CSI, after which the forward charting function used to obtain the channel chart is updated in step 702. Accordingly, the FIG. 7 process is illustratively configured to collect CSI over multiple processing intervals and to update the forward charting function in one or more of the multiple processing intervals.

Numerous other techniques can be used in association with generation and processing of channel charts in illustrative embodiments. For example, alternative processes can initiate various types of automated actions in a wireless system utilizing predictions or other types of estimates generating using channel charts.

Accordingly, the particular processing operations and other functionality described in conjunction with the flow diagram of FIG. 7 are presented by way of illustrative example only, and should not be construed as limiting the scope of the invention in any way. Alternative embodiments can use other types of processing operations involving channel charts. For example, the ordering of the process steps may be varied in other embodiments, or certain steps may be performed concurrently with one another rather than serially. Also, multiple instances of the process may be performed in respective distinct base stations or other wireless system components and/or for respective different sets of one or more wireless devices.

It is to be appreciated that the particular CC algorithms, parameters and other arrangements described above in conjunction with FIGS. 3 through 7 are presented by way of illustrative example only, and a wide variety of alternative channel charting implementations can be used in other embodiments.

For example, other embodiments can utilize additional or alternative channel features that are particularly resilient to shadowing, and more advanced CC algorithms, such as methods relying on metric learning or convolutional neural networks that take into account side information. Other possible extensions include utilization with semi-supervised methods. Other embodiments can also be specifically configured to address time-varying channels, multi-user scenarios and other variations relative to the illustrative embodiments.

A given processing platform or other system component implementing one or more channel charting operations is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, a GPU, an ALU, a DSP, or other similar processing device component, as well as other types and arrangements of processing circuitry, in any combination. For example, a given module or set of modules configured to perform one or more channel charting operations in a processing device as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, ROM, magnetic memory, optical memory, non-volatile memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with channel charting as well as other related functionality.

Processing devices in a given embodiment can include, for example, computers or other types of processing hardware and associated software and firmware implemented in a base station, RRH, BBU or other component of a wireless system.

A wireless system and/or an information processing system as disclosed herein may be implemented using one or more processing platforms, or portions thereof.

For example, one illustrative embodiment of a processing platform that may be used to implement at least a portion of a wireless system and/or an information processing system comprises cloud infrastructure including virtual machines implemented using a hypervisor that runs on physical infrastructure. Such virtual machines may comprise respective processing devices that communicate with one another over one or more networks. As a more particular example of an arrangement of this type, virtual machines may be used to implement wireless system components such as RRHs and BBUs of a Cloud-RAN. Numerous other wireless system components can be implemented at least in part using virtual machines or other types of virtualization infrastructure.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the wireless system and/or information processing system.

Additionally or alternatively, operating system level virtualization techniques based on Linux control groups may be used. Such arrangements illustratively include Docker containers or other types of Linux containers. Again, such containers may be used in implementing wireless system components such as RRHs and BBUs of a Cloud-RAN.

Another illustrative embodiment of a processing platform that may be used to implement at least a portion of a wireless system and/or an information processing system as disclosed herein comprises a plurality of processing devices which communicate with one another over at least one network. Each processing device of the processing platform is assumed to comprise a processor coupled to a memory.

Again, these particular processing platforms are presented by way of example only, and a wireless system and/or an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in a wireless system and/or an associated information processing system.

Such components can communicate with other components over any type of network or other communication media.

As indicated previously, components of a given system as disclosed herein can be implemented at least in part in the form of one or more software programs stored in memory and executed by a processor of a processing device. For example, certain functionality associated with channel charting components of a wireless system and/or an associated information processing system can be implemented at least in part in the form of software.

The particular configurations of wireless systems and/or information processing systems described herein are exemplary only, and a given such system in other embodiments may include other elements in addition to or in place of those specifically shown, including one or more elements of a type commonly found in a conventional implementation of such a system.

For example, in some embodiments, a wireless system and/or an information processing system may be configured to utilize the disclosed techniques to provide additional or alternative functionality in other contexts.

Thus, techniques illustrated in some embodiments herein in the context of providing channel charting functionality in 5G wireless systems can be adapted in a straightforward manner for use in other contexts involving different types of wireless systems.

Accordingly, illustrative embodiments of the invention should not be viewed as limited to use with 5G wireless systems or any other particular types of wireless systems or their associated processing contexts.

It is also to be appreciated that the particular process steps used in the embodiments described herein are exemplary only, and other embodiments can utilize different types and arrangements of processing operations. For example, certain process steps described as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of wireless systems, information processing systems and/or processing devices than those utilized in the particular illustrative embodiments described herein, and in numerous alternative processing contexts. In addition, the particular assumptions made herein in the context of describing certain embodiments need not apply in other embodiments. These and numerous other alternative embodiments will be readily apparent to those skilled in the art.

What is claimed is:

1. An apparatus comprising:
a processing platform comprising one or more processing devices each including at least one processor coupled to a memory;
the processing platform being configured:
to extract channel features of a wireless channel of a wireless system from channel state information characterizing a radio geometry of the wireless channel;
to generate a forward charting function that maps the extracted channel features to a channel chart characterizing a representational spatial geometry of the wireless channel; and
to utilize the channel chart to estimate at least one position-related characteristic of one or more wireless devices in an actual spatial geometry of the wireless channel.

2. The apparatus of claim 1 wherein the channel state information is generated by one or more multi-antenna receivers of the wireless system utilizing communications received from the one or more wireless devices over the wireless channel.

3. The apparatus of claim 2 wherein the channel state information comprises channel measurements that are collected over time by a given one of the multi-antenna receivers from a plurality of wireless device transmit locations in a designated area of the wireless system.

4. The apparatus of claim 3 wherein the designated area comprises one of:
a served cell of a base station that includes the given multi-antenna receiver; and
a multi-cell area covered by a baseband unit of a cloud radio access network.

5. The apparatus of claim 1 wherein generating the forward charting function comprises performing an unsupervised learning process to learn the forward charting function from the extracted channel features.

6. The apparatus of claim 5 wherein the unsupervised learning process is configured to implement a designated dimensionality reduction technique to map a relatively high-dimensional point set of the extracted channel features into a relatively low-dimensional point set of the channel chart.

7. The apparatus of claim 5 wherein the unsupervised learning process utilizes side information obtained from a baseband unit of the wireless system.

8. The apparatus of claim 7 wherein the side information obtained from the baseband unit comprises information indicating that a particular subset of the extracted channel features are associated with a particular one of the one or more wireless devices.

9. The apparatus of claim 1 wherein at least a portion of the extracted channel features characterize at least one of large-scale fading effects, directional information and time-of-flight information of the wireless channel.

10. The apparatus of claim 1 wherein the representational spatial geometry characterized by the channel chart has a substantially lower dimensionality than the radio geometry of the wireless channel.

11. The apparatus of claim 1 wherein the channel chart is configured to preserve local geometry of multiple spatial locations associated with the extracted features in the actual spatial geometry of the wireless channel such that first and second points that are located close to one another in the actual spatial geometry of the wireless channel are also close to one another in the channel chart and vice versa.

12. The apparatus of claim 1 wherein the processing platform is further configured to generate an inverse charting function relating spatial locations in the representational spatial geometry of the wireless channel to channel features of the wireless channel.

13. The apparatus of claim 12 wherein generating the inverse charting function comprises performing an unsupervised learning process to learn the inverse charting function from the representational spatial geometry.

14. The apparatus of claim 13 wherein fully unsupervised learning is performed to generate both the forward charting function and the inverse charting function.

15. The apparatus of claim 1 wherein utilizing the channel chart to estimate at least one position-related characteristic of one or more wireless devices in an actual spatial geometry of the wireless channel comprises at least one of:
estimating positional information of a given wireless device;
predicting an in-cell event involving the given wireless device;
estimating channel state information between the given wireless device and one or more base stations in one or more cells of the wireless system other than a current cell of the given wireless device; and
estimating channel state information between the given wireless device and at least one other wireless device.

16. The apparatus of claim 1 wherein utilizing the channel chart to estimate at least one position-related characteristic of one or more wireless devices in an actual spatial geometry of the wireless channel comprises:
extracting additional channel features from additional channel state information characterizing the radio geometry of the wireless channel;
comparing the additional channel features to the channel chart; and
estimating the position-related characteristic based at least in part on a result of the comparing.

17. The apparatus of claim 1 wherein the processing platform comprises at least one of:
a base station of the wireless system;
a baseband unit of a cloud radio access network of the wireless system;
a wireless access point of the wireless system; and
a given one of the one or more wireless devices of the wireless system.

18. A method comprising:
extracting channel features of a wireless channel of a wireless system from channel state information characterizing a radio geometry of the wireless channel;
generating a forward charting function that maps the extracted channel features to a channel chart characterizing a representational spatial geometry of the wireless channel; and
utilizing the channel chart to estimate at least one position-related characteristic of one or more wireless devices in an actual spatial geometry of the wireless channel;
wherein the method is performed by a processing platform comprising at least one processing device comprising a processor coupled to a memory.

19. The method of claim 18 wherein generating the forward charting function comprises performing an unsupervised learning process to learn the forward charting function from the extracted channel features.

20. The method of claim 18 wherein the channel chart is configured to preserve local geometry of multiple spatial locations associated with the extracted features in the actual spatial geometry of the wireless channel such that first and second points that are located close to one another in the actual spatial geometry of the wireless channel are also close to one another in the channel chart and vice versa.

21. A computer program product comprising a non-transitory processor-readable storage medium having stored therein program code of one or more software programs, wherein the program code when executed by at least one processing device of a processing platform causes processing platform:
to extract channel features of a wireless channel of a wireless system from channel state information characterizing a radio geometry of the wireless channel;
to generate a forward charting function that maps the extracted channel features to a channel chart characterizing a representational spatial geometry of the wireless channel; and
to utilize the channel chart to estimate at least one position-related characteristic of one or more wireless devices in an actual spatial geometry of the wireless channel.

22. The computer program product of claim 21 wherein generating the forward charting function comprises performing an unsupervised learning process to learn the forward charting function from the extracted channel features.

23. The computer program product of claim 21 wherein the channel chart is configured to preserve local geometry of multiple spatial locations associated with the extracted features in the actual spatial geometry of the wireless channel such that first and second points that are located close to one another in the actual spatial geometry of the wireless channel are also close to one another in the channel chart and vice versa.

* * * * *